US012615359B2

(12) United States Patent
Kidani et al.

(10) Patent No.: US 12,615,359 B2
(45) Date of Patent: Apr. 28, 2026

(54) IMAGE DECODING DEVICE, IMAGE DECODING METHOD, AND PROGRAM

(71) Applicant: KDDI CORPORATION, Tokyo (JP)

(72) Inventors: Yoshitaka Kidani, Fujimino (JP); Kei Kawamura, Fujimino (JP); Kyohei Unno, Fujimino (JP); Sei Naito, Fujimino (JP)

(73) Assignee: KDDI CORPORATION, Tokyo (JP)

(*) Notice: Subject to any disclaimer, the term of this patent is extended or adjusted under 35 U.S.C. 154(b) by 422 days.

(21) Appl. No.: 17/615,543

(22) PCT Filed: Dec. 2, 2020

(86) PCT No.: PCT/JP2020/044804
§ 371 (c)(1),
(2) Date: Dec. 29, 2022

(87) PCT Pub. No.: WO2021/131548
PCT Pub. Date: Jul. 1, 2021

(65) Prior Publication Data
US 2023/0109719 A1 Apr. 13, 2023

(30) Foreign Application Priority Data
Dec. 26, 2019 (JP) ................................. 2019-237278

(51) Int. Cl.
*H04N 19/105* (2014.01)
*H04N 19/176* (2014.01)
*H04N 19/46* (2014.01)

(52) U.S. Cl.
CPC ......... *H04N 19/105* (2014.11); *H04N 19/176* (2014.11); *H04N 19/46* (2014.11)

(58) Field of Classification Search
CPC .... H04N 19/105; H04N 19/176; H04N 19/46; H04N 19/119; H04N 19/172;
(Continued)

(56) References Cited

U.S. PATENT DOCUMENTS

2020/0374528 A1* 11/2020 Huang ................. H04N 19/176
2021/0006803 A1* 1/2021 Zhang ................... H04N 19/18
(Continued)

FOREIGN PATENT DOCUMENTS

CN 114450946 A * 5/2022 ........... H04N 19/105
JP 2023503683 A 1/2023
WO 2021104433 A1 6/2021

OTHER PUBLICATIONS

Extended European Search Report dated Jun. 23, 2023, from corresponding European Application No. 20904382.7.
(Continued)

*Primary Examiner* — Nathnael Aynalem
(74) *Attorney, Agent, or Firm* — Troutman Pepper Locke LLP

(57) ABSTRACT

An image decoding device includes a merge unit configured to apply geometric block partitioning merge to a target block divided in a rectangular shape, wherein the merge unit includes: a merge mode specifying unit configured to specify whether or not the geometric block partitioning merge is applied; a geometric block partitioning unit configured to specify a geometric block partitioning pattern and further perform geometric block partitioning on the target block divided in the rectangular shape by using the specified geometric block partitioning pattern; and a merge list construction unit configured to construct a merge list for the target block subjected to the geometric block partitioning and decode motion information.

3 Claims, 24 Drawing Sheets

(58) Field of Classification Search

CPC .... H04N 19/174; H04N 19/159; H04N 19/70; H04N 19/593; H04N 19/136; H04N 19/52; H04N 19/11; H04N 19/124; H04N 19/132; H04N 19/18; H04N 19/44; H04N 19/50; H04N 19/139; H04N 19/157; H04N 19/51; H04N 19/61; H04N 19/134; H04N 19/196; H04N 19/107; H04N 19/109; H04N 19/137; H04N 19/186; H04N 19/463; H04N 19/583; H04N 19/117; H04N 19/126; H04N 19/14; H04N 19/142; H04N 19/167; H04N 19/182; H04N 19/423; H04N 19/503; H04N 19/513; H04N 19/537; H04N 19/577

USPC ............................................ 375/240–240.29

See application file for complete search history.

(56) References Cited

U.S. PATENT DOCUMENTS

| | | | |
|---|---|---|---|
| 2021/0051335 A1* | 2/2021 | Liao | H04N 19/503 |
| 2022/0086429 A1* | 3/2022 | Ko | H04N 19/52 |
| 2022/0210460 A1* | 6/2022 | Deng | H04N 19/137 |
| 2022/0264151 A1* | 8/2022 | Lim | H04N 19/70 |

OTHER PUBLICATIONS

Chaing et al., "CE10-related: Syntax redundancy removal in triangle prediction", Joit Video Experts Team (JVET) of ITU-T SG 16 WP 3 and ISO/IEC JTC 1/SC 29/WG 11, JVET-M0185-v1, Jan. 9, 2019-Jan. 18, 2019.

Sullivan et al., "Overview of the High Efficiency Video Coding (HEVC) Standard", IEEE Transactions on Circuits and Systems for Video Technology, Jan. 1, 2012, pp. 1-19 XP055045358.

Wang et al., "CE4-related: An imporoved method for triangle merge list construction", JVET Meeting, Mar. 19, 2019-Mar. 27, 2019, JVET-N0340, Joint Video Experts Team (JVET) of ITU-T SG 16 WP 3 and ISO/IEC JTC 1/SC 29/WG 11.

Notice of Reasons for Refusal dated Nov. 7, 2023, from corresponding Japanese Application No. 2021-131823.

Liu et al., "Non-CE4: Modification of Triangle merge mode enabling criterion", JVET-00222, 15th Meeting: Gothenburg, SE, Jul. 3-12, 2019.

International Search Report issued in PCT/JP2020/044804 dated Feb. 16, 2021.

Telecommunication Standardization Sector of ITU, ITU-T H.265, "High Efficiency Video Coding", Feb. 2018, pp. 1-692. cited in specification.

Bross, B., et al. Versatile Video Coding (Draft 5), JVET-N1001-v8 of ITU-T SG 16 WP 3 and ISO/IEC JTC 1/SC 29/WG 11 14th meeting: Geneva, CH, 19-27 (Mar. 2019), pp. 1-10. cited in ISR.

Bross, B., et al. "Versatile Video Coding (Draft 7)", JVET-Q2001 of ITU-T SG 16 WP 3 and ISO/IEC JTC 1/SC 29 WG 11 16th Meeting: Geneva, CH, 1-11 (Oct. 2019), pp. 1-16. cited in ISR and specification.

Gao, H., et al. "CE4 Common Base: Geometric inter prediction", JVET-Q0079-v1 of ITU-T SG 16 WP 3 and ISO/IEC JTC 1/SC 29 WG 11 17th Meeting: Brussels, BE, 7-17 (Jan. 2020), pp. 1-4 cited in ISR.

Kidani, Y., et al. "Non-CE4: On merge list generation for geometric partitioning", JVET-Q0127_v2 of ITU-T SG 16 WP 3 and ISO/IEC JTC 1/SC 29/WG 11 17th Meeting: Brussels, BE, 7-17 (Jan. 2020), pp. 1-8. cited in ISR.

Zhipin, D., et al. "CE4-related: Further constraints on block shapes for GEO", JVET-Q0309 of ITU-T SG 16 WP 3 and ISO/IEC JTC 1/SC 29/WG 11 17th Meeting: Brussels, BE, 7-17 (Jan. 2020), pp. 1-11. cited in ISR.

Bross, B., et al. Versatile Video Coding (Draft 8), JVET-Q2001-vE of ITU=T SG 16 WP 3 and ISO/IEC JTC 1/SC 29/ WG 11 17th Meeting: Brussels, BE, 7-17 (Jan. 2020), pp. 1-19. cited in ISR.

Reuze et al., "CE4-related: Simplification of GEO Using Angles with Power-of-Two Tangents," Joint Video Experts Team (JVET), Oct. 11, 2019, Geneva, Switzerland.

Deng et al., "CE4-1.14 Related: Block Size Limitation of Enabling TPM and GEO," Joint Video Experts Team (JVET), Oct. 11, 2019, Geneva, Switzerland.

Jingya Li, "CE4-Related: Modifications of GEO," Joint Video Experts Team (JVET), Jan. 17, 2020, Brussels, Belgium.

Japanese Patent Office, Notice of Reasons for Refusal, Jun. 3, 2025, for related JP Appl. No. 2024166919.

\* cited by examiner

IMAGE CODING
DEVICE

IMAGE DECODING
DEVICE

Figure 4:
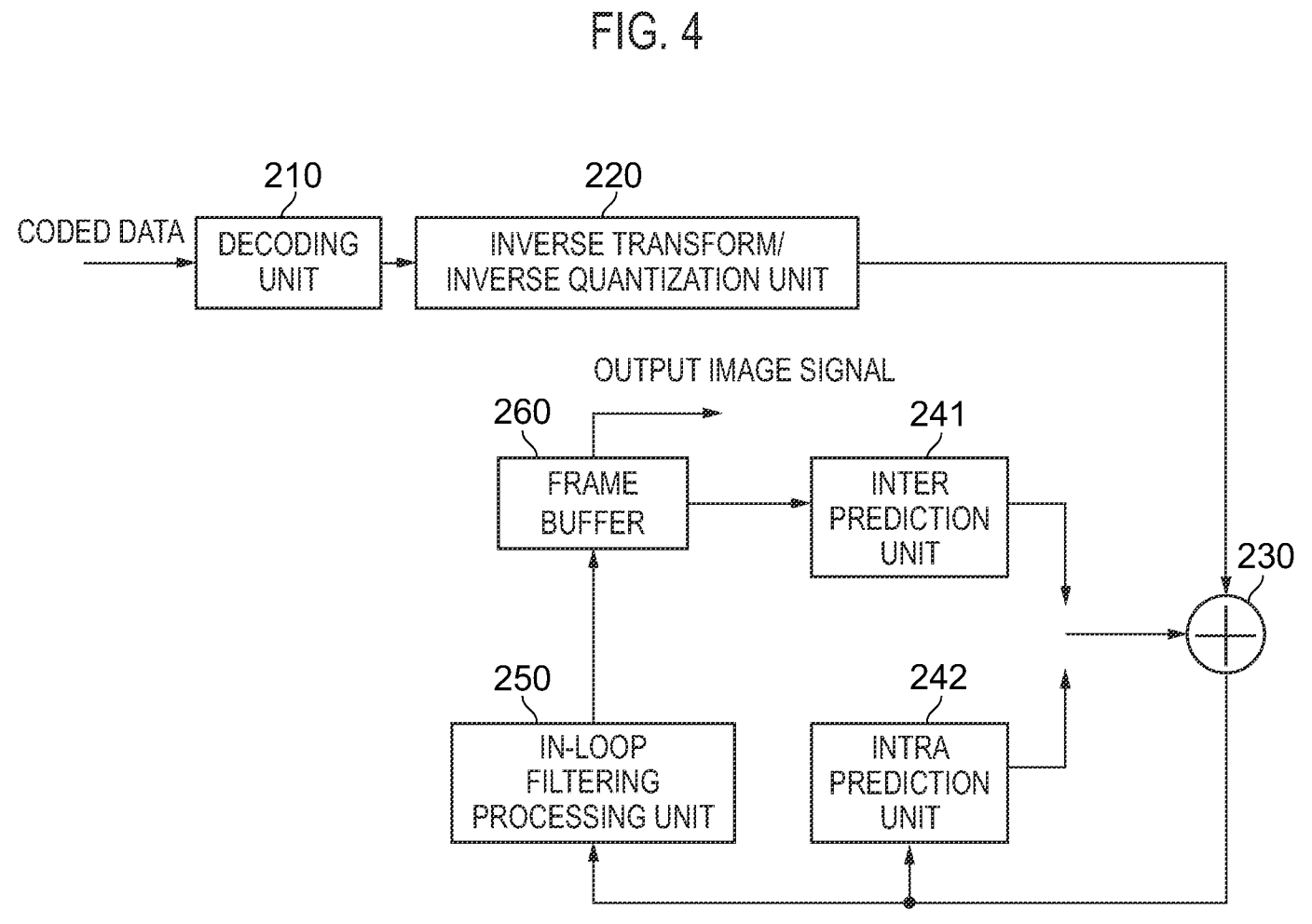

CODED DATA → 210 DECODING UNIT → 220 INVERSE TRANSFORM/ INVERSE QUANTIZATION UNIT → 230 (⊕)

OUTPUT IMAGE SIGNAL

241 INTER PREDICTION UNIT

242 INTRA PREDICTION UNIT

260 FRAME BUFFER

250 IN-LOOP FILTERING PROCESSING UNIT

Figure 6:
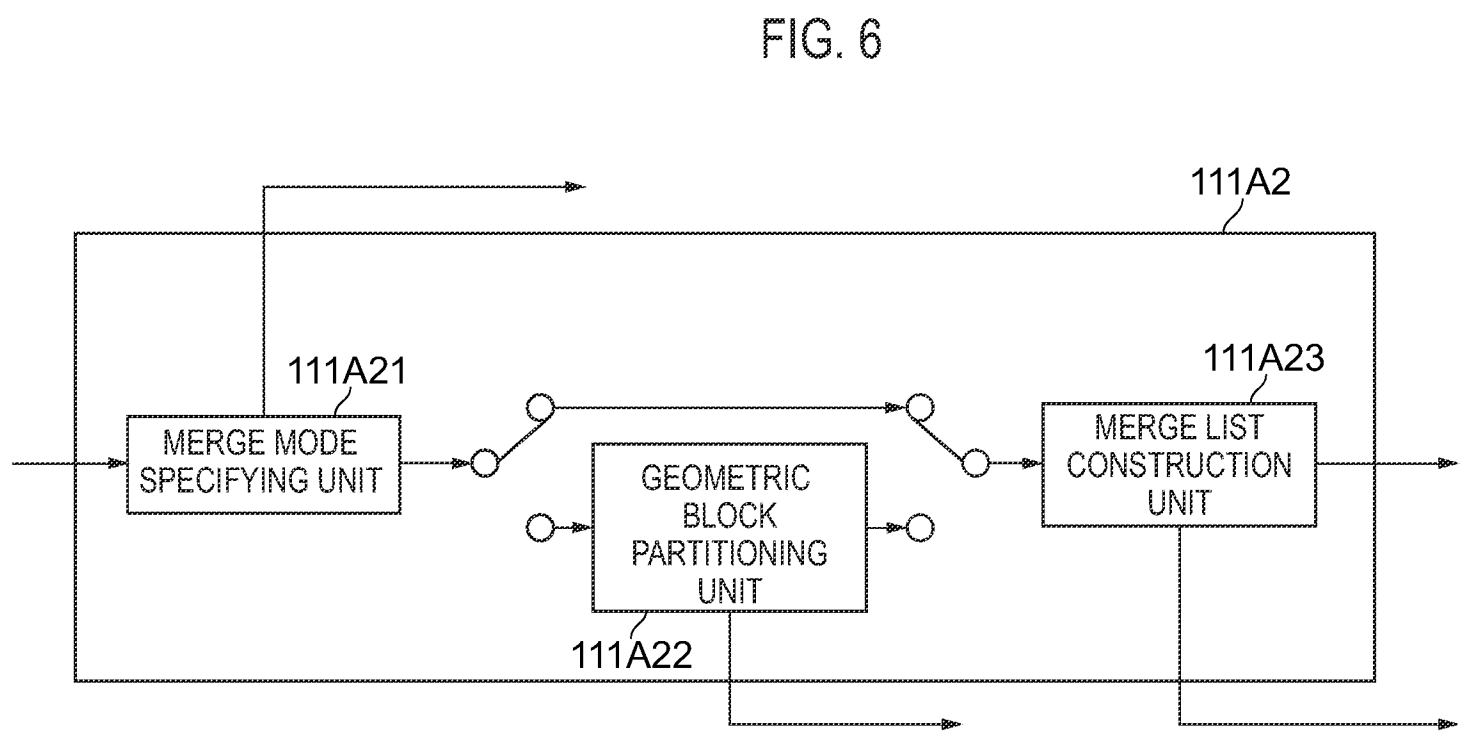

111A21 MERGE MODE SPECIFYING UNIT

111A22 GEOMETRIC BLOCK PARTITIONING UNIT

111A23 MERGE LIST CONSTRUCTION UNIT

FIG. 7

FIG. 12A
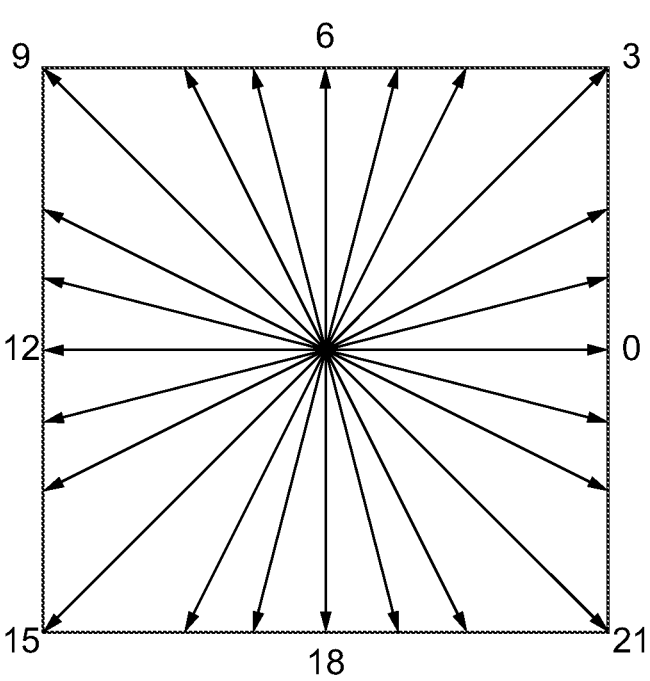
FIG. 12B
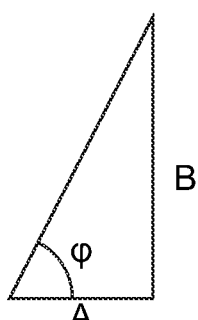
FIG. 12C
| No. | 0 | ... | 3 | ... | 6 | ... | 9 | ... |
|---|---|---|---|---|---|---|---|---|
| A | 1 | ... | 1 | ... | 0 | ... | -1 | ... |
| B | 0 | ... | 1 | ... | 1 | ... | 1 | ... |
| $\varphi=\tan^{-1}(A/B)$ | 0° | ... | 45 | ... | 90 | ... | 135° | ... |

| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| partition_idx | 0 | 1 | 2 | 3 | 4 | 5 | 6 | 7 | 8 | 9 | 10 | 11 | 12 | 13 | 14 | 15 | 16 | 17 |
| angle_idx | 0 | 0 | 0 | 1 | 1 | 1 | 1 | 2 | 2 | 2 | 2 | 3 | 3 | 3 | 3 | 4 | 4 | 4 |
| distance_idx | 1 | 2 | 3 | 0 | 1 | 2 | 3 | 0 | 1 | 2 | 3 | 0 | 1 | 2 | 3 | 0 | 1 | 2 |
| partition_idx | 18 | 19 | 20 | 21 | 22 | 23 | 24 | 25 | 26 | 27 | 28 | 29 | 30 | 31 | 32 | 33 | 34 | 35 |
| angle_idx | 4 | 5 | 5 | 5 | 5 | 6 | 6 | 6 | 7 | 7 | 7 | 7 | 8 | 8 | 8 | 8 | 9 | 9 |
| distance_idx | 3 | 0 | 1 | 2 | 3 | 1 | 2 | 3 | 0 | 1 | 2 | 3 | 0 | 1 | 2 | 3 | 0 | 1 |
| partition_idx | 36 | 37 | 38 | 39 | 40 | 41 | 42 | 43 | 44 | 45 | 46 | 47 | 48 | 49 | 50 | 51 | 52 | 53 |
| angle_idx | 9 | 9 | 10 | 10 | 10 | 10 | 11 | 11 | 11 | 11 | 12 | 12 | 12 | 13 | 13 | 13 | 14 | 14 |
| distance_idx | 2 | 3 | 0 | 1 | 2 | 3 | 0 | 1 | 2 | 3 | 1 | 2 | 3 | 1 | 2 | 3 | 1 | 2 |
| partition_idx | 54 | 55 | 56 | 57 | 58 | 59 | 60 | 61 | 62 | 63 | 64 | 65 | 66 | 67 | 68 | 69 | 70 | 71 |
| angle_idx | 14 | 15 | 15 | 15 | 16 | 16 | 16 | 17 | 17 | 17 | 18 | 18 | 18 | 19 | 19 | 19 | 20 | 20 |
| distance_idx | 3 | 1 | 2 | 3 | 1 | 2 | 3 | 1 | 2 | 3 | 1 | 2 | 3 | 1 | 2 | 3 | 1 | 2 |
| partition_idx | 72 | 73 | 74 | 75 | 76 | 77 | 78 | 79 | 80 | 81 | | | | | | | | |
| angle_idx | 20 | 21 | 21 | 21 | 22 | 22 | 22 | 23 | 23 | 23 | | | | | | | | |
| distance_idx | 3 | 1 | 2 | 3 | 1 | 2 | 3 | 1 | 2 | 3 | | | | | | | | |

$12 \leq$ angle_idx $< 23$ $0$ DEGREES $\leq$ angle_idx $< 12$

| merge_idx | mvL0 | mvL1 | RefIdxL0 | RefIdxL1 | MERGE PROCESSING IN WHICH LIST IS CONSTRUCTED |
|---|---|---|---|---|---|
| 0 | mvL0A$_1$ | mvL1A$_1$ | ⋮ | ⋮ | SPATIAL MERGE A$_1$ |
| 1 | mvL0B$_1$ | mvL1B$_1$ | ⋮ | ⋮ | SPATIAL MERGE B$_1$ |
| 2 | mvL0B$_2$ | mvL1B$_2$ | ⋮ | ⋮ | SPATIAL MERGE B$_2$ |
| 3 | mvL0C$_1$ | mvL1C$_1$ | ⋮ | ⋮ | TEMPORAL MERGE C$_1$ |
| 4 | mvL0HM$_1$ | mvL1HM$_1$ | ⋮ | ⋮ | HISTORY MERGE HM$_1$ |
| 5 | mvL0Avg | mvL1Avg | ⋮ | ⋮ | PAIRWISE AVERAGE MERGE |
| ⋮ | ⋮ | ⋮ | ⋮ | ⋮ | ⋮ |

PROCESSING ORDER
$B_1 \Rightarrow A_1 \Rightarrow B_0 \Rightarrow A_0 \Rightarrow B_2$

FIG. 22A

| | | | HM_idx (==6) | HM_idx (==5) | | | |
|---|---|---|---|---|---|---|---|
| | HM_idx (==4) | HM_idx (==3) | HM_idx (==2) | HM_idx (==1) | | TARGET CU | |
| | | | | | | | |

FIG. 22B

| HM_idx | mvL0 | mvL1 | RefIdxL0 | RefIdxL1 |
|---|---|---|---|---|
| 1 | ... | ... | ... | ... |
| 2 | ... | ... | ... | ... |
| 3 | ... | ... | ... | ... |
| 4 | ... | ... | ... | ... |
| 5 | ... | ... | ... | ... |
| 6 | ... | ... | ... | ... |
| ... | ... | ... | ... | ... |

IMAGE DECODING DEVICE, IMAGE DECODING METHOD, AND PROGRAM

CROSS REFERENCE TO RELATED APPLICATIONS

The present application is a U.S. National Phase of International Patent No. PCT/JP2020/044804, filed on Dec. 2, 2020, which claims the benefit of Japanese patent application No. 2019-237278 filed on Dec. 26, 2019. The entire contents of which are hereby incorporated by reference.

TECHNICAL FIELD

The present invention relates to an image decoding device, an image decoding method, and a program.

BACKGROUND

Versatile Video Coding (Draft 7), JVET-N 1001 and ITU-T H.265 High Efficiency Video Coding disclose a rectangular block partitioning technique (rectangular partitioning technique) called Quad-Tree-Binary-Tree-Ternary-Tree (QTBTTT).

However, there is a problem that, in a case where an object boundary appears in an arbitrary direction with respect to a block boundary, there is a possibility that appropriate block partitioning is not selected for the object boundary by the rectangular block partitioning in the above-described technique according to the conventional technique alone. Therefore, the present invention has been made in view of the above-described problems, and an object of the present invention is to provide an image decoding device, an image decoding method, and a program, in which an appropriate block partitioning shape is selected for an object boundary appearing in an arbitrary direction by applying geometric block partitioning merge to a target block divided in a rectangular shape, thereby making it possible to implement a coding performance improvement effect by reduction of a prediction error and implement a subjective image quality improvement effect by selection of an appropriate block partitioning boundary for an object boundary.

SUMMARY

The first aspect of the present invention is summarized as an image decoding device including: a merge unit configured to apply geometric block partitioning merge to a target block divided in a rectangular shape, wherein the merge unit includes: a merge mode specifying unit configured to specify whether or not the geometric block partitioning merge is applied; a geometric block partitioning unit configured to specify a geometric block partitioning pattern and further perform geometric block partitioning on the target block divided in the rectangular shape by using the specified geometric block partitioning pattern; and a merge list construction unit configured to construct a merge list for the target block subjected to the geometric block partitioning and decode motion information.

The second aspect of the present invention is summarized as an image decoding method including: applying geometric block partitioning merge to a target block divided in a rectangular shape, wherein the applying includes: specifying whether or not the geometric block partitioning merge is applied; specifying a geometric block partitioning pattern and further performing geometric block partitioning on the target block divided in the rectangular shape by using the specified geometric block partitioning pattern; and constructing a merge list for the target block subjected to the geometric block partitioning and decoding motion information.

The third aspect of the present invention is summarized as a program for causing a computer to function as an image decoding device, wherein the image decoding device includes a merge unit configured to apply geometric block partitioning merge to a target block divided in a rectangular shape, and the merge unit includes: a merge mode specifying unit configured to specify whether or not the geometric block partitioning merge is applied; a geometric block partitioning unit configured to specify a geometric block partitioning pattern and further perform geometric block partitioning on the target block divided in the rectangular shape by using the specified geometric block partitioning pattern; and a merge list construction unit configured to construct a merge list for the target block subjected to the geometric block partitioning and decode motion information.

According to the present invention, it is possible to provide an image decoding device, an image decoding method, and a program, in which an appropriate block partitioning shape is selected for an object boundary appearing in an arbitrary direction by applying geometric block partitioning merge to a target block divided in a rectangular shape, thereby making it possible to implement a coding performance improvement effect by reduction of a prediction error and implement a subjective image quality improvement effect by selection of an appropriate block partitioning boundary for an object boundary.

BRIEF DESCRIPTION OF DRAWINGS

FIG. 1 is a diagram illustrating an example of a configuration of an image processing system 1 according to an embodiment.

FIG. 3 is a diagram illustrating an example of functional blocks of an inter prediction unit 111 of the image coding device 100 according to the embodiment.

FIG. 4 is a diagram illustrating an example of functional blocks of an image decoding device 200 according to the embodiment.

FIG. 6 is a diagram illustrating an example of functional blocks of a merge unit 111A2 of the inter prediction unit 111 of the image coding device 100 according to the embodiment.

FIG. 7 is a diagram illustrating an example of functional blocks of a merge unit 241A2 of the inter prediction unit 241 of the image decoding device 200 according to the embodiment.

FIG. 12 is a diagram illustrating an example of an elevation angle φ defining a geometric block partitioning pattern according to a modified example.

FIG. 18 is a diagram illustrating an example of the merge list constructed as a result of executing the motion information registration/pruning processing for the merge list according to the embodiment.

FIG. 22 is a diagram for describing history merge according to the embodiment.

DETAILED DESCRIPTION

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

Figure 1:
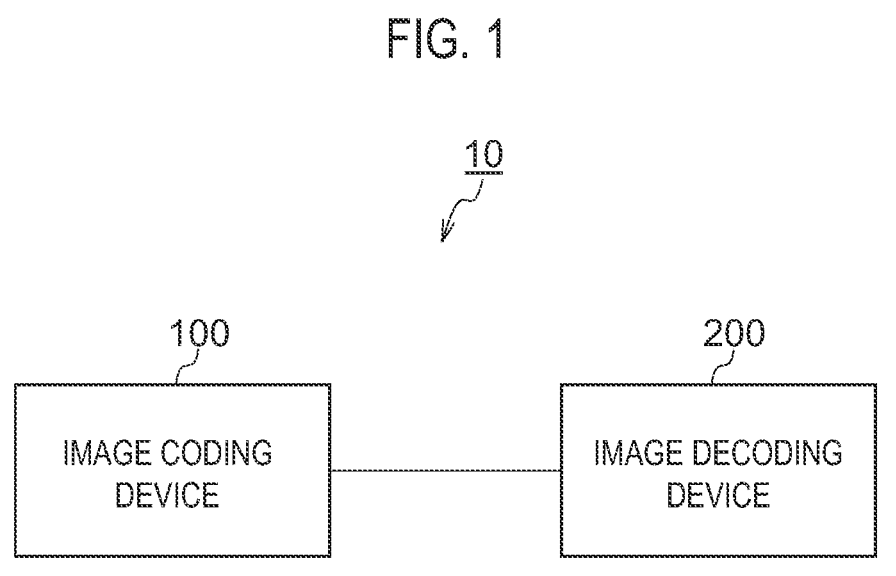

Hereinafter, an image processing system 10 according to a first embodiment of the present invention will be described with reference to FIGS. 1 to 10. FIG. 1 is a diagram illustrating the image processing system 10 according to the present embodiment.

As illustrated in FIG. 1, the image processing system 10 according to the present embodiment includes an image coding device 100 and an image decoding device 200.

The image coding device 100 is configured to generate coded data by coding an input image signal. The image decoding device 200 is configured to generate an output image signal by decoding the coded data.

The coded data may be transmitted from the image coding device 100 to the image decoding device 200 via a transmission path. The coded data may be stored in a storage medium and then provided from the image coding device 100 to the image decoding device 200.

Figure 2:
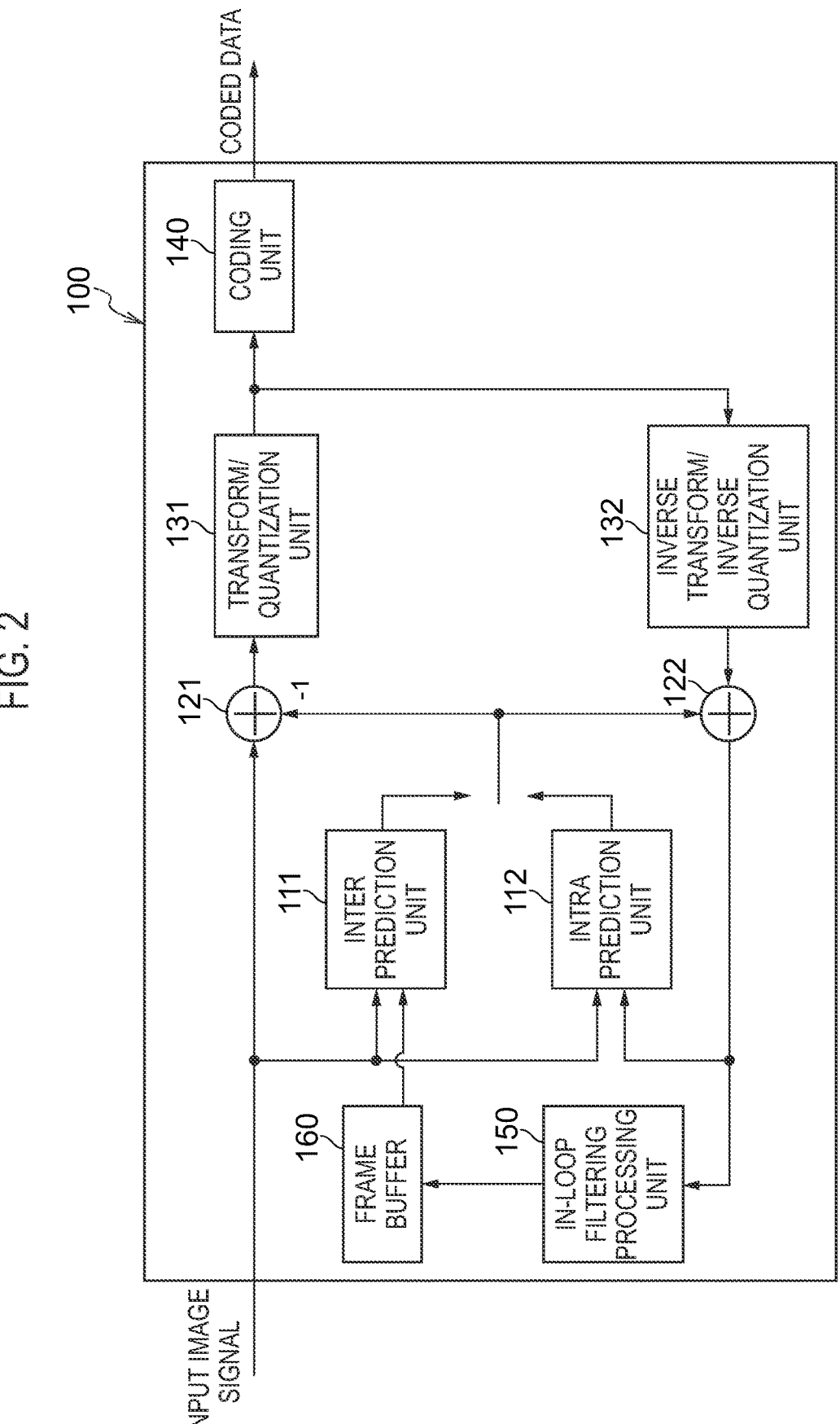
FIG. 2 is a diagram illustrating an example of functional blocks of an image coding device 100 according to the embodiment.

Hereinafter, the image coding device 100 according to the present embodiment will be described with reference to FIG. 2. FIG. 2 is a diagram illustrating an example of functional blocks of the image coding device 100 according to the present embodiment.

2, the image coding device 100 includes an inter prediction unit 111, an intra prediction unit 112, a subtractor 121, an adder 122, a transform/quantization unit 131, an inverse transform/inverse quantization unit 132, a coding unit 140, an in-loop filtering processing unit 150, and a frame buffer 160.

The inter prediction unit 111 is configured to generate a prediction signal by inter prediction (inter-frame prediction).

Specifically, the inter prediction unit 111 is configured to specify a reference block included in a reference frame by comparing a frame to be coded (hereinafter, referred to as a target frame) with the reference frame stored in the frame buffer 160, and determine a motion vector (mv) for the specified reference block.

The inter prediction unit 111 is configured to generate the prediction signal included in a block to be coded (hereinafter, referred to as a target block) for each target block based on the reference block and the motion vector. The inter prediction unit 111 is configured to output the prediction signal to the subtractor 121 and the adder 122. Here, the reference frame is a frame different from the target frame.

The intra prediction unit 112 is configured to generate a prediction signal by intra prediction (intra-frame prediction).

Specifically, the intra prediction unit 112 is configured to specify the reference block included in the target frame, and generate the prediction signal for each target block based on the specified reference block. Furthermore, the intra prediction unit 112 is configured to output the prediction signal to the subtractor 121 and the adder 122.

Here, the reference block is a block referred to for the target block. For example, the reference block is a block adjacent to the target block.

The subtractor 121 is configured to subtract the prediction signal from the input image signal, and output a prediction residual signal to the transform/quantization unit 131. Here, the subtractor 121 is configured to generate the prediction residual signal that is a difference between the prediction signal generated by intra prediction or inter prediction and the input image signal.

The adder 122 is configured to add the prediction signal to the prediction residual signal output from the inverse transform/inverse quantization unit 132 to generate a pre-filtering decoded signal, and output the pre-filtering decoded signal to the intra prediction unit 112 and the in-loop filtering processing unit 150.

Here, the pre-filtering decoded signal constitutes the reference block used by the intra prediction unit 112.

The transform/quantization unit 131 is configured to perform transform processing for the prediction residual signal and acquire a coefficient level value. Furthermore, the transform/quantization unit 131 may be configured to perform quantization of the coefficient level value.

Here, the transform processing is processing of transforming the prediction residual signal into a frequency component signal. In such transform processing, a base pattern (transformation matrix) corresponding to discrete cosine transform (DCT) may be used, or a base pattern (transformation matrix) corresponding to discrete sine transform (DST) may be used.

The inverse transform/inverse quantization unit 132 is configured to perform inverse transform processing for the coefficient level value output from the transform/quantization unit 131. Here, the inverse transform/inverse quantization unit 132 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The coding unit 140 is configured to code the coefficient level value output from the transform/quantization unit 131 and output coded data.

Here, for example, the coding is entropy coding in which codes of different lengths are assigned based on a probability of occurrence of the coefficient level value.

Furthermore, the coding unit 140 is configured to code control data used in decoding processing in addition to the coefficient level value.

Here, the control data may include size data such as a coding block (coding unit (CU)) size, a prediction block (prediction unit (PU)) size, and a transform block (transform unit (TU)) size.

Furthermore, the control data may include header information such as a sequence parameter set (SPS), a picture parameter set (PPS), and a slice header as described later.

The in-loop filtering processing unit 150 is configured to execute filtering processing on the pre-filtering decoded signal output from the adder 122 and output the filtered decoded signal to the frame buffer 160.

Here, for example, the filtering processing is deblocking filtering processing for reducing distortion occurring at a boundary portion of a block (coding block, prediction block, or transform block).

The frame buffer 160 is configured to accumulate the reference frames used by the inter prediction unit 111.

Here, the filtered decoded signal constitutes the reference frame used by the inter prediction unit 111.

Figure 3:
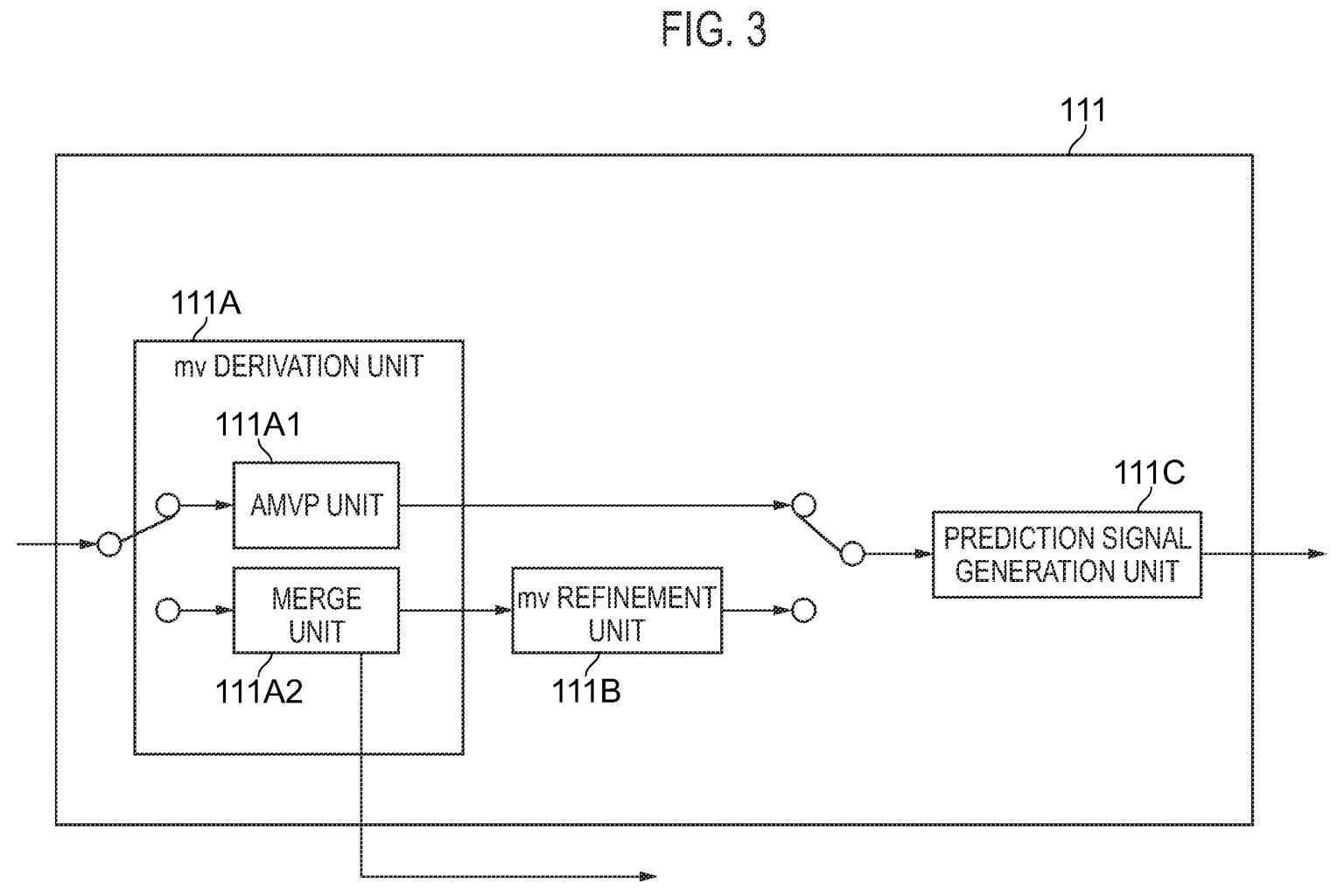

Hereinafter, the inter prediction unit 111 of the image coding device 100 according to the present embodiment will be described with reference to FIG. 3. FIG. 3 is a diagram illustrating an example of functional blocks of the inter prediction unit 111 of the image coding device 100 according to the present embodiment.

As illustrated in FIG. 3, the inter prediction unit 111 includes an mv derivation unit 111A, an AMVR unit 111B, an mv refinement unit 111B, and a prediction signal generation unit 111D.

The inter prediction unit 111 is an example of a prediction unit configured to generate the prediction signal included in the target block based on the motion vector.

As illustrated in FIG. 3, the mv derivation unit 111A includes an adaptive motion vector prediction (AMVP) unit 111A1 and a merge unit 111A2, and is configured to acquire the motion vector by using the target frame and the reference frame from the frame buffer 160 as inputs.

The AMVP unit 111A1 is configured to specify the reference block included in the reference frame by comparing the target frame with the reference frame, and search for the motion vector for the specified reference block.

In addition, the above-described search processing is executed on a plurality of reference frame candidates, the reference frame and the motion vector to be used for prediction in the target block are determined, and are output to the prediction signal generation unit 111D in the subsequent stage.

A maximum of two reference frames and two motion vectors can be used for one block. A case where only one set of the reference frame and the motion vector is used for one block is referred to as "uni-prediction", and a case where two sets of the reference frame and the motion vector are used is referred to as "bi-prediction". Hereinafter, the first set is referred to as "L0", and the second set is referred to as "L1".

Furthermore, in order to reduce a code amount when the determined motion vector described above is finally transmitted to the image decoding device 200, the AMVP unit 111A selects a motion vector predictor (mvp) in which a difference from the motion vector of the target block, that is, a motion vector difference (mvd) becomes small, from mvp candidates derived from adjacent coded motion vectors.

Indexes indicating the mvp and the mvd selected in this manner and an index indicating the reference frame (hereinafter, referred to as Refidx) are coded by the coding unit 140 and transmitted to the image decoding device 200. Such processing is generally called adaptive motion vector prediction (AMVP) coding.

Note that, since known methods can be adopted as the method of searching for the motion vector, the method of determining the reference frame and the motion vector, the method of selecting the mvp, and the method of calculating the mvd, the details thereof will be omitted.

Unlike the AMVP unit 111A1, the merge unit 111A2 is configured not to search for and derive motion information of the target block and further transmit the mvd as a difference from an adjacent block, but to use the target frame and the reference frame as inputs, use, as the reference block, an adjacent block in the same frame as that of the target block or a block at the same position in a frame different from that of the target frame, and inherit and use the motion information of the reference block as it is. Such processing is generally called merge coding (hereinafter, referred to as merge).

In a case where the block is merged, first, a merge list for the block is constructed. The merge list is a list in which a plurality of combinations of the reference frames and the motion vectors are listed. An index (hereinafter, referred to as a merge index) is assigned to each combination, and the image coding device 100 codes only the merge index described above instead of individually coding information regarding a combination of Refidx and the motion vector (hereinafter, referred to as motion information), and transmits the merge index to the image decoding device 200 side.

By commonizing a merge list construction method between the image coding device 100 and the image decoding device 200, the image decoding device 200 can decode the motion information only from the merge index information. The merge list construction method and a geometric block partitioning method for an inter prediction block according to the present embodiment will be described later.

The my refinement unit 111B is configured to execute refinement processing of correcting the motion vector output from the merge unit 111A2. For example, as the refinement processing of correcting the motion vector, decoder side motion vector refinement (DMVR) described in Versatile Video Coding (Draft 7), JVET-N 1001 is known. In the present embodiment, since the known method described in Versatile Video Coding (Draft 7), JVET-N 1001 can be used as the refinement processing, a description thereof will be omitted.

The prediction signal generation unit 111C is configured to output a motion compensation (MC) prediction image signal by using the reference frame and the motion vector as inputs. Since the known method described in Versatile Video Coding (Draft 7), JVET-N 1001 can be used as the processing in the prediction signal generation unit 111C, a description thereof will be omitted.

Hereinafter, the image decoding device 200 according to the present embodiment will be described with reference to FIG. 4. FIG. 4 is a diagram illustrating an example of functional blocks of the image decoding device 200 according to the present embodiment.

As illustrated in FIG. 4, the image decoding device 200 includes a decoding unit 210, an inverse transform/inverse quantization unit 220, an adder 230, an inter prediction unit 241, an intra prediction unit 242, an in-loop filtering processing unit 250, and a frame buffer 260.

The decoding unit 210 is configured to decode the coded data generated by the image coding device 100 and decode the coefficient level value.

Here, the decoding is, for example, entropy decoding performed in a reverse procedure to the entropy coding performed by the coding unit 140.

Furthermore, the decoding unit 210 may be configured to acquire control data by decoding processing for the coded data.

Note that, as described above, the control data may include size data such as a coding block size, a prediction block size, and a transform block size.

The inverse transform/inverse quantization unit 220 is configured to perform inverse transform processing for the coefficient level value output from the decoding unit 210. Here, the inverse transform/inverse quantization unit 220 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The adder 230 is configured to add the prediction signal to the prediction residual signal output from the inverse transform/inverse quantization unit 220 to generate a pre-filtering decoded signal, and output the pre-filtering decoded signal to the intra prediction unit 242 and the in-loop filtering processing unit 250.

Here, the pre-filtering decoded signal constitutes a reference block used by the intra prediction unit 242.

Similarly to the inter prediction unit 111, the inter prediction unit 241 is configured to generate a prediction signal by inter prediction (inter-frame prediction).

Specifically, the inter prediction unit 241 is configured to generate the prediction signal for each prediction block based on the motion vector decoded from the coded data and the reference signal included in the reference frame. The inter prediction unit 241 is configured to output the prediction signal to the adder 230.

Similarly to the intra prediction unit 112, the intra prediction unit 242 is configured to generate a prediction signal by intra prediction (intra-frame prediction).

Specifically, the intra prediction unit 242 is configured to specify the reference block included in the target frame, and generate the prediction signal for each prediction block based on the specified reference block. The intra prediction unit 242 is configured to output the prediction signal to the adder 230.

Similarly to the in-loop filtering processing unit 150, the in-loop filtering processing unit 250 is configured to execute filtering processing on the pre-filtering decoded signal output from the adder 230 and output the filtered decoded signal to the frame buffer 260.

Here, for example, the filtering processing is deblocking filtering processing for reducing distortion occurring at a boundary portion of a block (the coding block, the prediction block, the transform block, or a sub-block obtained by dividing them).

Similarly to the frame buffer 160, the frame buffer 260 is configured to accumulate the reference frames used by the inter prediction unit 241.

Here, the filtered decoded signal constitutes the reference frame used by the inter prediction unit 241.

(Inter Prediction Unit 241)

Figure 5:
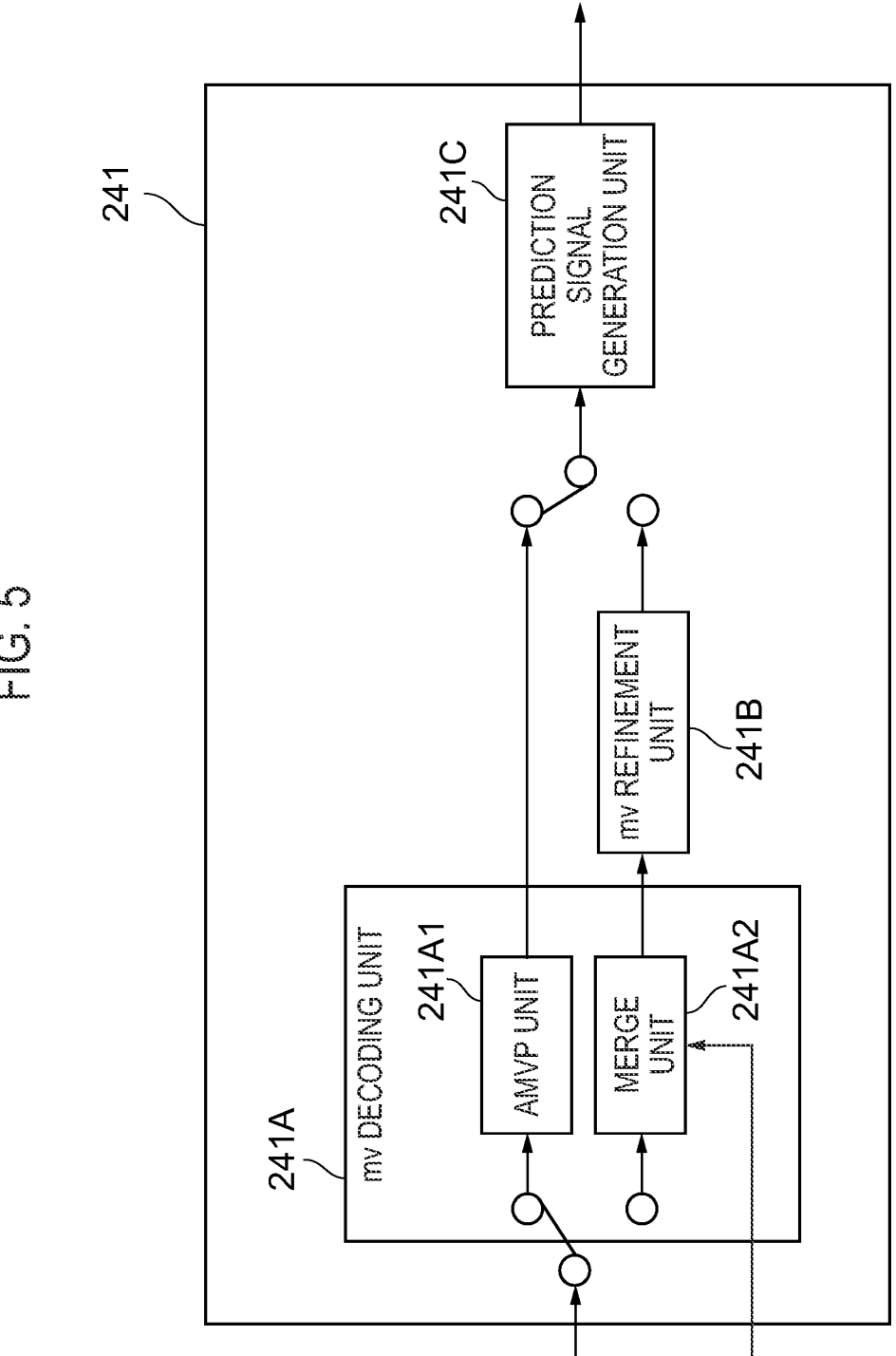
FIG. 5 is a diagram illustrating an example of functional blocks of an inter prediction unit 241 of the image decoding device 200 according to the embodiment.

Hereinafter, the inter prediction unit 241 according to the present embodiment will be described with reference to FIG. 5. FIG. 5 is a diagram illustrating an example of functional blocks of the inter prediction unit 241 according to the present embodiment.

As illustrated in FIG. 5, the inter prediction unit 241 includes an my decoding unit 241A, an my refinement unit 241B, and a prediction signal generation unit 241C.

The inter prediction unit 241 is an example of a prediction unit configured to generate the prediction signal included in the prediction block based on the motion vector.

The my decoding unit 241A includes an AMVP unit 241A1 and a merge unit 241A2, and is configured to acquire the motion vector by decoding the target frame and the reference frame input from the frame buffer 260 and the control data received from the image coding device 100.

The AMVP unit 241A1 is configured to receive the target frame, the reference frame, the indexes indicating the mvp and the mvd, and Refidx from the image coding device 100, and decode the motion vector. Since a known method can be adopted as a method of decoding the motion vector, details thereof will be omitted.

The merge unit 241A2 is configured to receive the merge index from the image coding device 100 and decode the motion vector.

Specifically, the merge unit 241A2 is configured to construct the merge list in the same manner as that in the image coding device 100 and acquire the motion vector corresponding to the received merge index from the constructed merge list. Details of a method of constructing the merge list will be described later.

The my refinement unit 241B is configured to execute refinement processing of correcting the motion vector, similarly to the my refinement unit 111B.

The prediction signal generation unit 241C is configured to generate the prediction signal based on the motion vector, similarly to the prediction signal generation unit 111C.

Note that details of the prediction signal generation processing when the geometric block partitioning merge is enabled will be described later. As for prediction signal generation processing when another merge mode is enabled, the known technique described in Versatile Video Coding (Draft 7), JVET-N 1001 can be used in the present embodiment, and thus a description thereof will be omitted.

(Merge Unit)

Figure 7:
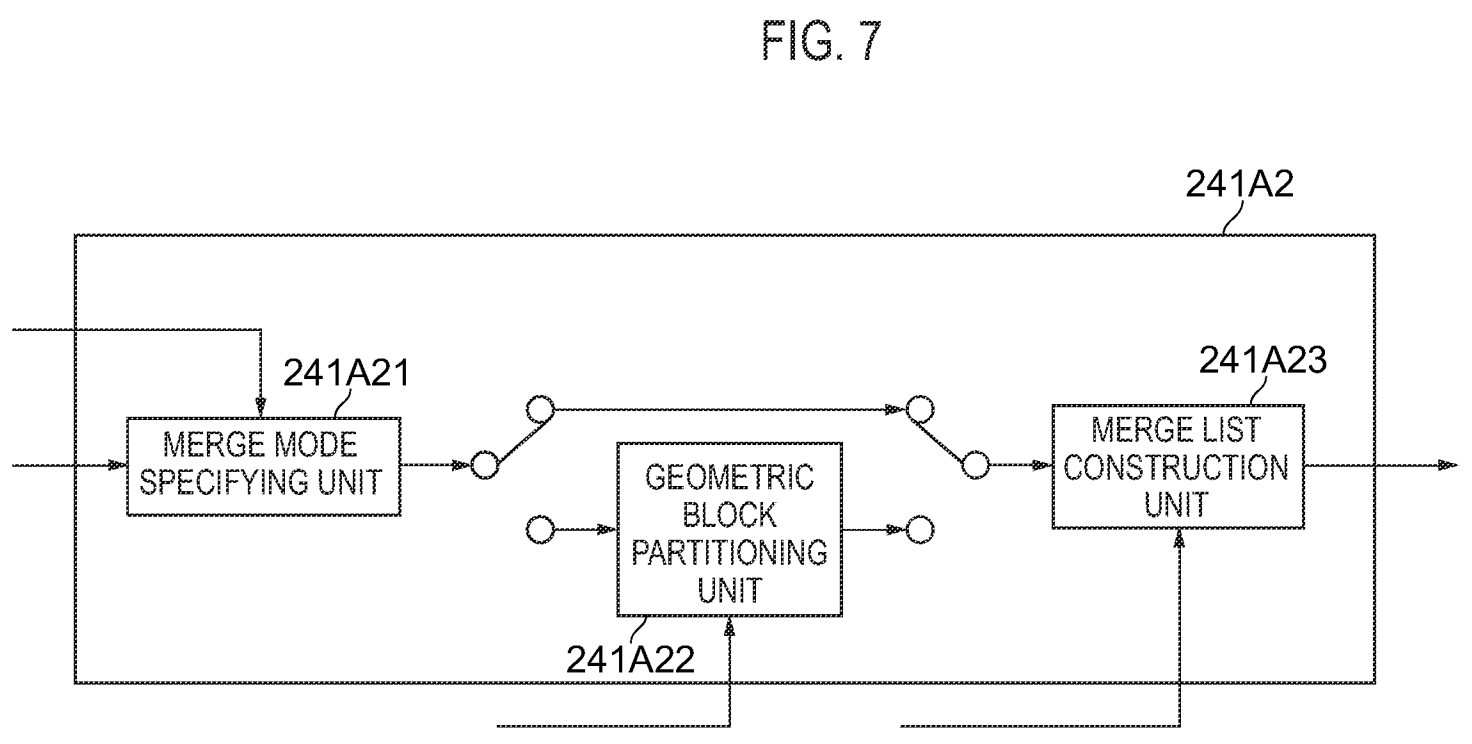

Hereinafter, the merge unit 111A2 of the inter prediction unit 111 of the image coding device 100 and the merge unit 241A2 of the inter prediction unit 241 of the image decoding device 200 according to the present embodiment will be described with reference to FIGS. 6 and 7. FIGS. 6 and 7 are diagrams illustrating examples of functional blocks of the merge unit 111A2 of the inter prediction unit 111 of the image coding device 100 and the merge unit 241A2 of the inter prediction unit 241 of the image decoding device 200 according to the present embodiment.

As illustrated in FIG. 6, the merge unit 111A2 includes a merge mode specifying unit 111A21, a geometric block partitioning unit 111A22, and a merge list construction unit 111A23.

Further, as illustrated in FIG. 7, the merge unit 241A2 includes a merge mode specifying unit 241A21, a geometric block partitioning unit 241A22, and a merge list construction unit 241A23.

The merge unit 111A2 is different from the merge unit 241A2 in that inputs and outputs of various indexes to be described later are reversed between the merge mode specifying unit 111A21 and the merge mode specifying unit 241A21, between the geometric block partitioning unit 111A22 and the geometric block partitioning unit 241A22, and between the merge list construction unit 111A23 and the merge list construction unit 241A23.

That is, various indexes output in the merge unit 111A2 are input in the merge unit 241A2. Other than that, the function of the merge unit 111A2 and the function of the merge unit 241A2 are the same as each other. Therefore, in order to simplify the description, the function of the merge unit 241A2 will be described below as a representative.

The merge mode specifying unit 241A21 is configured to specify whether or not a geometric block merge mode is applied to the target block divided in a rectangular shape.

Examples of the merge mode include regular merge, sub-block merge, a merge mode with MVD (MMVD), combined inter and intra prediction (CIIP), and intra block copy (IBC) adopted in Non Patent Literature 1, in addition to the geometric block partitioning merge.

In the present embodiment, by newly applying the geometric block partitioning merge in addition to these merge modes, even in a case where an object boundary appears in an arbitrary direction with respect to the target block divided in a rectangular shape, an appropriate block partitioning shape is selected by the geometric block partitioning. Therefore, as a result, a coding performance improvement effect by reduction of a prediction error and a subjective image quality improvement effect in the vicinity of the object boundary can be expected.

The geometric block partitioning unit 241A22 is configured to specify a geometric block partitioning pattern of the target block divided in a rectangular shape and divide the target block into geometric blocks by using the specified partitioning pattern. Details of a method of specifying the geometric block partitioning pattern will be described later.

The merge list construction unit 241A23 is configured to construct the merge list for the target block and decode the motion information.

Merge list construction processing includes three stages of motion information availability checking processing, motion information registration/pruning processing, and motion information decoding processing, and details thereof will be described later.

(Method of Specifying Whether or not Geometric Block Partitioning Merge is Applied in Merge Mode Specifying Unit 241A21)

Figure 8:
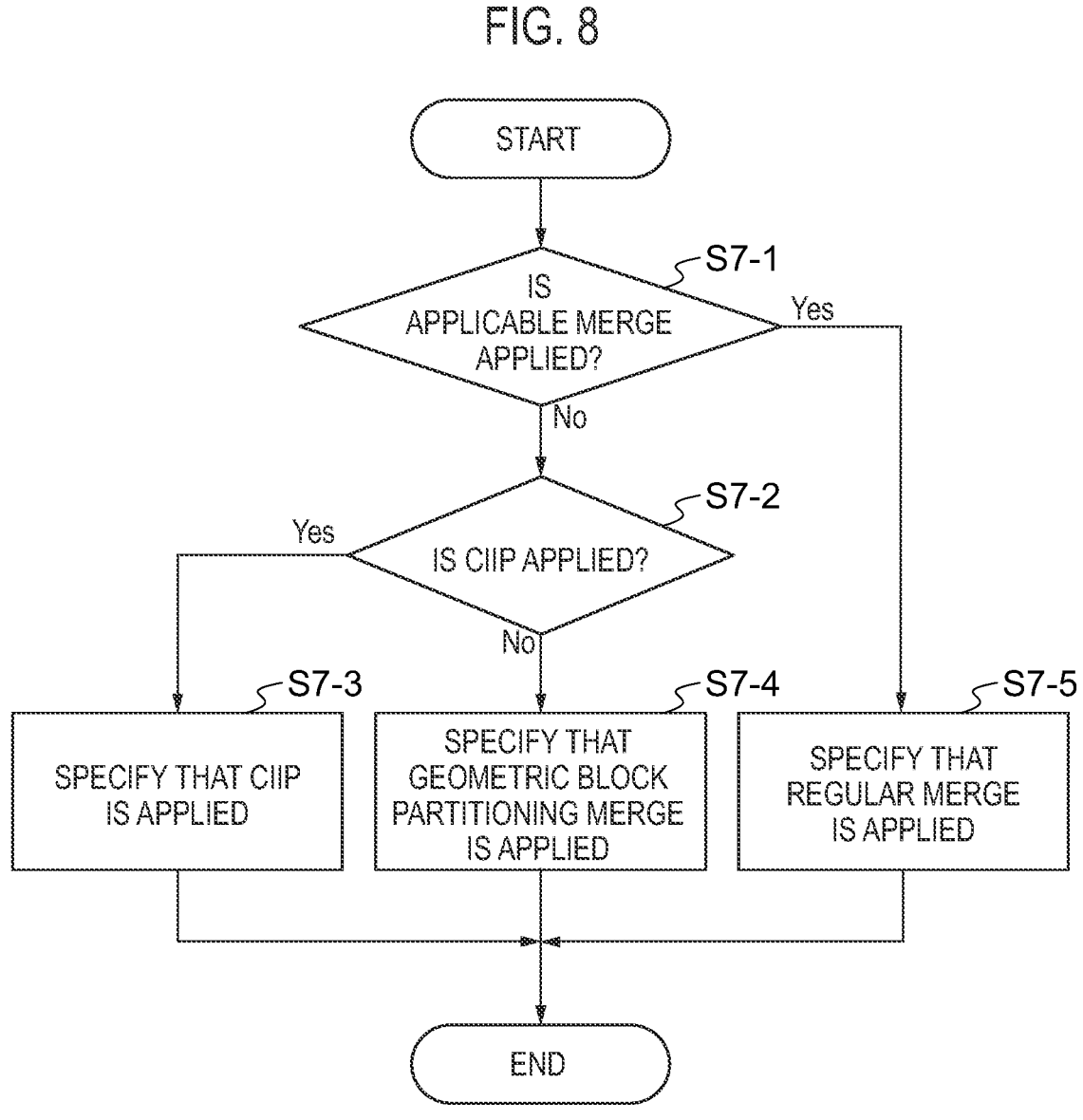
FIG. 8 is a flowchart illustrating an example of a method of specifying whether or not geometric block partitioning merge is applied in a merge mode specifying unit 241A21 of the inter prediction unit 241 of the image decoding device 200 according to the embodiment.
Figure 9:
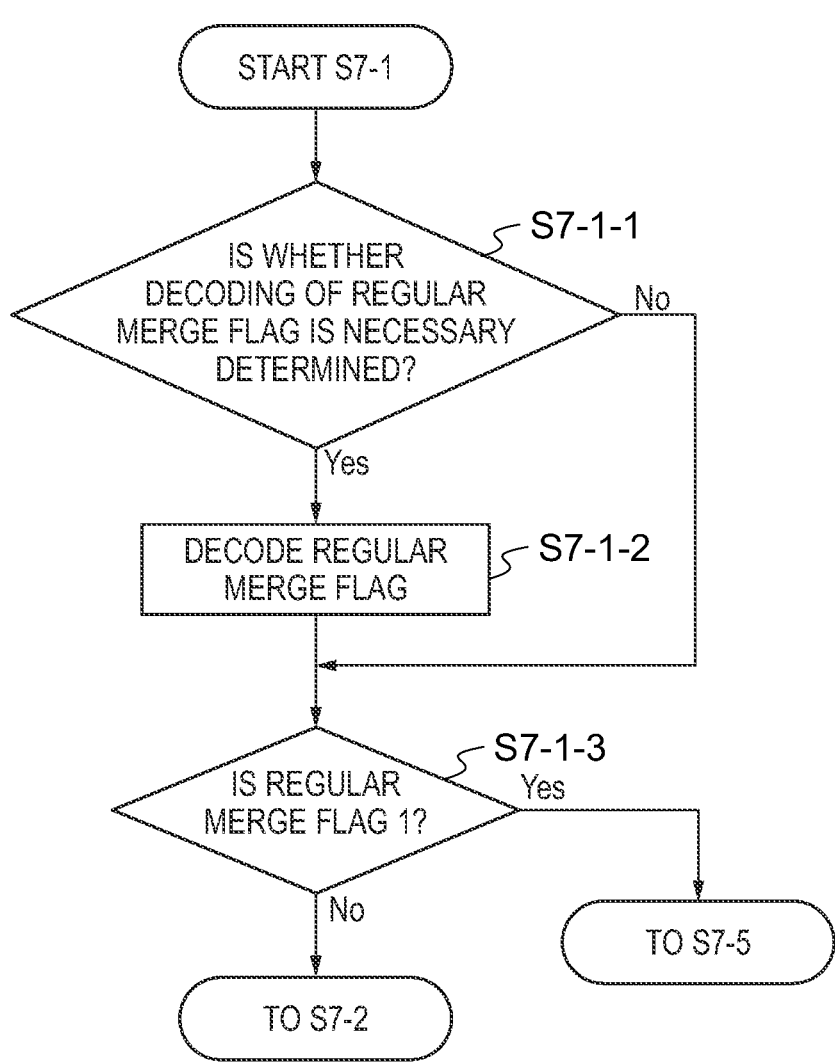
FIG. 9 is a flowchart illustrating the example of the method of specifying whether or not the geometric block partitioning merge is applied in the merge mode specifying unit 241A21 of the inter prediction unit 241 of the image decoding device 200 according to the embodiment.
Figure 10:
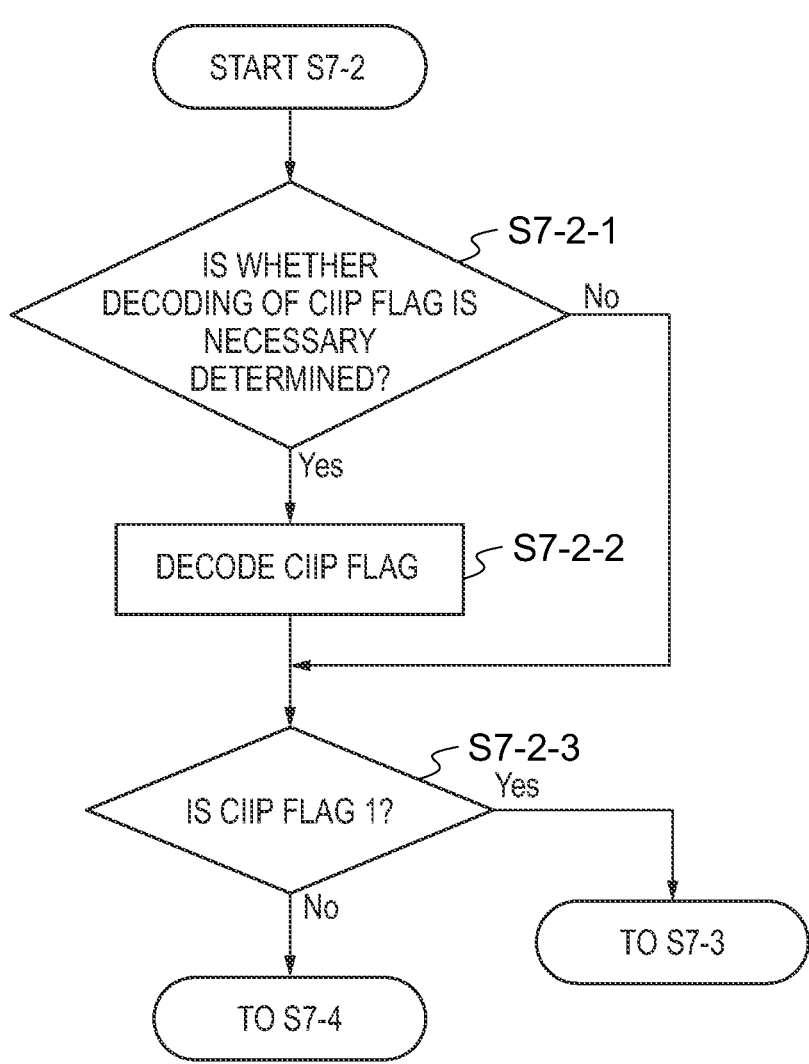
FIG. 10 is a flowchart illustrating the example of the method of specifying whether or not the geometric block partitioning merge is applied in the merge mode specifying unit 241A21 of the inter prediction unit 241 of the image decoding device 200 according to the embodiment.

Hereinafter, a method of specifying whether or not the geometric block partitioning merge is applied in the merge mode specifying unit 241A21 will be described with reference to FIGS. 8 to 10. FIGS. 8 to 10 are flowcharts illustrating an example of the method of specifying whether or not the geometric block partitioning merge is applied in the merge mode specifying unit 241A21.

As illustrated in FIG. 8, the merge mode specifying unit 241A21 is configured to specify that the geometric block partitioning merge is applied (the merge mode of the target block is the geometric block partitioning merge) in a case where the regular merge is not applied and the CIIP is not applied.

Specifically, as illustrated in FIG. 8, in Step S7-1, the merge mode specifying unit 241A21 specifies whether or not the regular merge is applied. The merge mode specifying unit 241A21 proceeds to Step S7-5 in a case where the merge mode specifying unit 241A21 specifies that the regular merge is applied, and the merge mode specifying unit 241A21 proceeds to Step S7-2 in a case where the merge mode specifying unit 241A21 specifies that the regular merge is not applied.

In Step S7-2, the merge mode specifying unit 241A21 specifies whether or not the CIIP is applied. The merge mode specifying unit 241A21 proceeds to Step S7-3 in a case where the merge mode specifying unit 241A21 specifies that the CIIP is applied, and the merge mode specifying unit 241A21 proceeds to Step S7-4 in a case where the merge mode specifying unit 241A21 specifies that the CIIP is not applied.

Note that the merge mode specifying unit 241A21 may skip Step S7-2 and directly proceed to Step S7-4. This means that in a case where the regular merge is not applied, the merge mode of the target block is specified as the geometric block partitioning merge.

In Step S7-3, the merge mode specifying unit 241A21 specifies that the CIIP is applied to the target block (the merge mode of the target block is the CIIP), and ends this processing.

Note that the image coding device 100 and the image decoding device 200 have, as internal parameters, a result of specifying whether or not the geometric block partitioning merge is applied to the target block.

In Step S7-4, the merge mode specifying unit 241A21 specifies that the geometric block partitioning merge is applied to the target block (the merge mode of the target block is the geometric block partitioning merge), and ends this processing.

In Step S7-5, the merge mode specifying unit 241A21 specifies that the regular merge is applied to the target block (the merge mode of the target block is the regular merge), and ends this processing.

Note that, in the flowchart of FIG. 8, even in a case where Step S7-2 is substituted with merge other than the CIIP in the future, the merge mode specifying unit 241A21 may specify whether or not the geometric block partitioning merge is applied according to a result of determining whether or not the merge as the substitute is applicable.

Furthermore, in the flowchart of FIG. 8A, also in a case where merge other than the CIIP is added between Step S7-2 and Step S7-4 in the future, the merge mode specifying unit 241A21 may specify whether or not the geometric block partitioning merge is applied according to a result of determining whether or not the added merge is applicable.

Next, a condition for determination of whether or not the regular merge is applied in Step S7-1 will be described with reference to FIG. 9.

As illustrated in FIG. 9, in Step S7-1-1, the merge mode specifying unit 241A21 determines whether or not decoding of a regular merge flag is necessary.

In a case where the merge mode specifying unit 241A21 determines that the condition for the determination of Step S7-1-1 is satisfied, that is, the decoding of the regular merge is necessary, the merge mode specifying unit 241A21 proceeds to Step S7-1-2. In a case where the merge mode specifying unit 241A21 determines that the condition for the determination of Step S7-1-1 is not satisfied, that is, the decoding of the regular merge is unnecessary, the merge mode specifying unit 241A21 proceeds to Step S7-1-3.

Here, in a case where the merge mode specifying unit 241A21 determines that the decoding of the regular merge flag is unnecessary, the merge mode specifying unit 241A21 can estimate a value of the regular merge flag based on "general_merge_flag" indicating whether or not the target block is inter-predicted by merge and a sub-block merge flag indicating whether or not the sub-block merge is applied, similarly to the method described in Non Patent Literature 1.

As for such an estimation method, the same method as the method described in Non Patent Literature 1 can be used in the present embodiment, and thus a description thereof will be omitted.

The condition for the determination of whether or not decoding of the regular merge flag is necessary in Step S7-1-1 includes a condition for determination of whether or not the CIIP is applicable and a condition for determination of whether or not the geometric block merge is applicable. Specifically, the following can be applied.

The condition for determination of whether or not the CIIP is applicable (1) The area of the target block is greater than or equal to 64 pixels.

(2) A CIIP enable flag of an SPS level is "enable" (the value is 1).

(3) A skip mode flag of the target block is "disable" (the value is 0).

(4) The width of the target block is less than 128 pixels.

(5) The height of the target block is less than 128 pixels.

The condition for determination of whether or not the geometric block merge is applicable (1) The area of the target block is greater than or equal to 64 pixels.

(6) A geometric block partitioning merge enable flag of the SPS level is "enable" (the value is 1).

(7) The maximum number of registrable merge indexes of the merge list for the geometric block partitioning merge (hereinafter, the maximum number of geometric block partitioning merge candidates) is larger than one.

(8) The width of the target block is greater than or equal to eight pixels.

(9) The height of the target block is greater than or equal to eight pixels.

(10) A slice type including the target block is a B slice (bi-prediction slice).

The merge mode specifying unit 241A21 determines that the CIIP is applicable in a case where all of the conditional expressions (1) to (5) are satisfied in the condition for the determination of whether or not the CIIP is applicable, and the merge mode specifying unit 241A21 determines that the CIIP is not applicable in other cases.

As for the respective conditional expressions in the condition for determination of whether or not the CIIP is applicable, the same conditional expressions described in Non Patent Literature 1 can be used in the present embodiment, and thus a description thereof will be omitted.

In addition, the merge mode specifying unit 241A21 determines that the geometric block partitioning merge is applicable in a case where all of the above-described conditional expressions (1) and (6) to (10) are satisfied in the condition for determination of whether or not the geometric block merge is applicable, and the merge mode specifying unit 241A21 determines that the geometric block partitioning merge is not applicable in other cases.

The conditional expressions (1) and (6) to (10) will be described later in detail.

The merge mode specifying unit 241A21 proceeds to Step S7-1-2 in a case where, in the condition for determination of whether or not the decoding of the regular merge flag is necessary in Step S7-1-1, any one of the condition for determination of whether or not the CIIP is applicable and the condition for determination of whether or not the geometric block partitioning merge is applicable is satisfied, and the merge mode specifying unit 241A21 proceeds to Step S7-1-3 in a case where neither of the conditions is satisfied.

Note that the condition for determination of whether or not the CIIP is applicable may be excluded from the condition for determination of whether or not the decoding of the regular merge flag is necessary in Step S7-1-1. This means that only the condition for determination of whether or not the geometric block partitioning merge is applicable is added as the condition for determination of whether or not the decoding of the regular merge flag is necessary.

In Step S7-1-2, the merge mode specifying unit 241A21 decodes the regular merge flag, and proceeds to Step S7-1-3.

In Step S7-1-3, the merge mode specifying unit 241A21 determines whether or not the value of the regular merge flag is 1. In a case where the value is 1, the merge mode specifying unit 241A21 proceeds to Step S7-5, and in a case where the value is not 1, the merge mode specifying unit 241A21 proceeds to Step S7-2.

Next, the condition for determination of whether or not the CIIP is applicable in Step S7-2 will be described with reference to FIG. 10.

As illustrated in FIG. 10, in Step S7-2-1, the merge mode specifying unit 241A21 determines whether or not decoding of a CIIP flag is necessary.

In a case where the merge mode specifying unit 241A21 determines that Step S7-2-1 is satisfied, that is, the decoding of the CIIP flag is necessary, the merge mode specifying unit 241A21 proceeds to Step S7-2-2, and in a case where Step S7-2-1 is not satisfied, that is, the decoding of the CIIP flag is not necessary, the merge mode specifying unit 241A21 proceeds to Step S7-2-3.

Here, in a case where the merge mode specifying unit 241A21 determines that the decoding of the CIIP flag is not necessary, the merge mode specifying unit 241A21 estimates a value of the CIIP flag as follows.

In a case where all of the following conditions are satisfied, the merge mode specifying unit 241A21 determines that the CIIP is enabled, that is, the value of the CIIP flag is 1, and otherwise, the merge mode specifying unit 241A21 determines that the CIIP is disabled, that is, the value of the CIIP flag is 0.

(1) The area of the target block is greater than or equal to 64 pixels.

(2) The regular merge flag is 0.

(3) The CIIP enable flag of the SPS level is "enable" (the value is 1).

(4) The skip mode flag of the target block is "enable" (the value is 0).

(5) The width of the target block is less than 128 pixels.

(6) The height of the target block is less than 128 pixels.

(12) "general_merge_flag" is 1.

(13) The sub-block merge flag is 0.

The condition for determination of whether or not the decoding of the CIIP flag is necessary in Step S7-2-1 includes the condition for determination of whether or not the CIIP is applicable and the condition for determination of whether or not the geometric block partitioning merge is applicable as described above.

The merge mode specifying unit 241A21 proceeds to Step S7-2-2 in a case where both the condition for determination of whether or not the CIIP is applicable and the condition for determination of whether or not the geometric block partitioning merge is applicable are satisfied, and the merge mode specifying unit 241A21 proceeds to Step S7-2-3 in a case where neither of the conditions is satisfied.

Here, since the merge mode specifying unit 241A21 has already determined that the conditional expression (1) is satisfied in the condition for determination of whether or not the decoding of the regular merge flag is necessary before determining the condition for determination of whether or not the decoding of the CIIP flag is necessary, the conditional expression (1) may be excluded from Step S7-2-1.

In Step S7-2-2, the merge mode specifying unit 241A21 decodes the CIIP flag, and proceeds to Step S7-1-3.

In Step S7-2-3, the merge mode specifying unit 241A21 determines whether or not the value of the CIIP flag is 1. In a case where the value is 1, the merge mode specifying unit 241A21 proceeds to Step S7-3, and in a case where the value is not 1, the merge mode specifying unit 241A21 proceeds to Step S7-4.

(Explanation of Condition for Determination of Whether or not Geometric Block Partitioning Merge is Applicable)

Details of (1) and (6) to (10) relating to the condition for determination of whether or not the geometric block partitioning merge is applicable will be described below.

(1) In order to limit the target block to which the geometric block partitioning merge is applicable to a relatively large block, the area of the target block is greater than or equal to 64 pixels.

(6) A flag indicating whether or not the geometric block partitioning merge is applicable is newly provided at the SPS level. In a case where such a flag is "disable", it can be specified that the geometric block merge is not applicable to the target block. Therefore, the flag is added to the conditional expression for determination of whether or not the geometric block partitioning merge is applicable.

(7) A lower limit of the width of the target block is set to eight pixels or more in order to prevent a memory bandwidth required at the time of motion compensation prediction of the inter prediction block of Versatile Video Coding (Draft 7), JVET-N 1001 from exceeding the worst case bandwidth.

(8) A lower limit of the height of the target block is set to eight pixels or more in order to prevent the memory bandwidth required at the time of motion compensation prediction of the inter prediction block of Versatile Video Coding (Draft 7), JVET-N 1001 from exceeding the worst case bandwidth.

(9) The target block to which the geometric block partitioning merge is applicable has two different pieces of motion information across a partitioning boundary. Therefore, in a case where the target block is included in the B slice, it can be specified that the geometric block partitioning merge is applicable to the target block. On the other hand, in a case where the target block is included in a slice other than the B slice, that is, in a case where the target block cannot have two different motion vectors, it is possible to specify that the geometric block partitioning merge is not applicable to the target block.

(10) The geometric block partitioning merge requires two different pieces of motion information as described above, and the merge list construction unit specifies (decodes) the two different pieces of motion information from the motion information associated with two different merge indexes registered in the merge list. Therefore, in a case where the maximum number of geometric block partitioning merge candidates is designed or specified to be one or less, it can be specified that the geometric block partitioning merge is not applicable to the target block. Therefore, a parameter for calculating the maximum number of geometric block partitioning merge candidates is provided inside the geometric block partitioning unit. The maximum number of geometric block partitioning merge candidates may have the same value as the maximum number of registrable merge indexes (hereinafter, the maximum number of merge candidates) of the merge list for the regular merge, or may be calculated by transmitting, from the image coding device 100 to the image decoding device 200, a flag that defines how many candidates to be reduced from the maximum number of merge candidates and decoding the flag in order to use another value, for example.

Modified Example 1: Addition of Determination Condition Based on Block Aspect Ratio to Condition for Determination of Whether or not Geometric Block Partitioning Merge is Applicable Hereinafter, Modified Example 1 of the present invention will be described focusing on differences from the first embodiment described above with reference to FIG. 11.

In Modified Example 1, in order to further restrict the application of the geometric block partitioning merge to the target block, determination based on a block size (upper limit) or a block aspect ratio of the target block may be added to the condition for determination of whether or not the geometric block partitioning merge is applicable as described above.

First, it is considered to add a conditional expression that sets an upper limit of each of the height and the width of the target block for which it is specified that the geometric block partitioning merge is applicable, to, for example, 64 pixels or less.

The reason why the upper limit of each of the height and the width is 64 pixels or less is to avoid violation of a constraint for maintaining a pipeline processing unit of the image decoding device 200 called a virtual pipeline data unit (VPDU) adopted in Versatile Video Coding (Draft 7), JVET-N 1001.

In Versatile Video Coding (Draft 7), JVET-N 1001, since the size of the VPDU is set to 64×64 pixels, the upper limit of the application target range of the geometric block partitioning merge is set to 64 pixels.

On the other hand, such an upper limit may be set to a smaller upper limit such as 32 pixels or less based on the designer's intention.

In the geometric block partitioning merge, when generating the MC prediction image signal, the MC prediction image signal generated based on the two different motion vectors across the geometric block partitioning boundary is generated by using a blending mask table weighted by a distance from the geometric block partitioning boundary.

It is desirable in terms of implementation that the size of the blending mask table can be reduced by reducing the upper limits of the width and height of the target block, and a recording capacity of a memory can be reduced by reducing the size of the blending mask table that needs to be held in the memories of the image coding device 100 and the image decoding device 200.

Secondly, it is considered to add a conditional expression in which the aspect ratio of the target block for which it is specified that the geometric block partitioning merge is applicable is, for example, 4 or less.

Such an elongated rectangular block having an aspect ratio of 8 or more is less likely to occur in a natural image. Therefore, in a case where the application of the geometric block partitioning merge is prohibited for such a rectangular block, the number of variations (the number of variations of parameters defining a position and a direction of the geometric block partitioning boundary in the rectangular block) of a geometric block partitioning shape to be described later can be reduced, and there is an effect that the recording capacity for the parameters for defining the variations can be reduced in the image coding device 100 and the image decoding device 200.

(Method of Defining Geometric Block Partitioning Pattern in Geometric Block Partitioning Unit)

Figure 11:
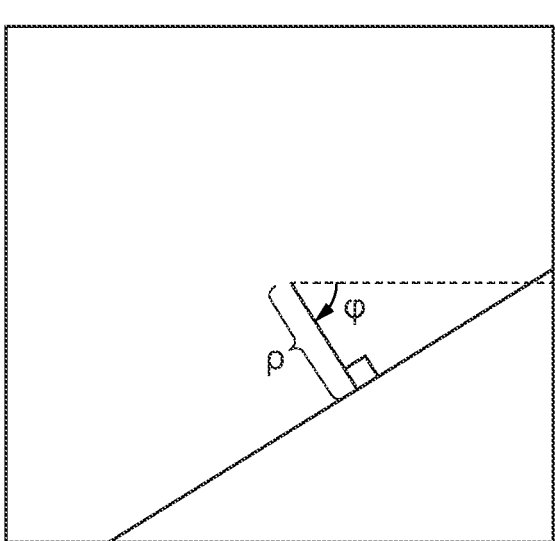
FIG. 11 is a diagram illustrating an example of a method of defining a geometric block partitioning pattern according to a modified example.

Hereinafter, a method of defining the geometric block partitioning pattern in the geometric block partitioning unit 241A22 according to the present embodiment will be described with reference to FIG. 11. FIG. 11 is a diagram illustrating an example of the method of defining the geometric block partitioning pattern according to the present embodiment.

For example, as illustrated in FIG. 11, the geometric block partitioning pattern may be defined by two parameters including the position of the geometric block partitioning boundary line, that is, a distance ρ from a central point of the target block divided in a rectangular shape (hereinafter, the central point) to the geometric block partitioning boundary line (hereinafter, the partitioning boundary line), and an elevation angle φ from a horizontal direction in a perpendicular line from the central point with respect to the partitioning boundary line.

Furthermore, a combination of the distance ρ and the elevation angle φ may be transmitted from the image coding device 100 (the merge unit 111A2) to the image decoding device 200 (the merge unit 241A2) by using an index.

The more the variations of the combination of the distance ρ and the angle φ defining the geometric block partitioning pattern, the more the prediction error can be expected to be reduced, but on the other hand, an increase in processing time required to specify the combination of the distance ρ and the elevation angle φ and an increase in code length of the index for indicating such a combination are in a trade-off relationship, and thus the distance ρ and the elevation angle φ quantized based on the designer's intention may be used.

Here, the quantized distance ρ may be designed in units of predetermined pixels, for example. Furthermore, the quantized elevation angle φ may be designed to be an angle obtained by equally dividing 360 degrees, for example.

Modified Example 2: Method of Defining Elevation Angle ρ

Hereinafter, Modified Example 2 of the present invention will be described focusing on differences from the first embodiment and Modified Example 1 described above with reference to FIG. 12. FIG. 12 is a diagram illustrating a modified example of the elevation angle φ defining the above-described geometric block partitioning pattern.

In Modified Example 1 described above, the method of defining the elevation angle φ by using an angle obtained by equally dividing 360 degrees has been described as an example of the method of defining the elevation angle cp. However, in the present modified example, as illustrated in FIG. 12(*b*), the elevation angle φ may be defined by using the block aspect ratio that can be taken by the target block and the horizontal/vertical directions.

For example, as illustrated in FIG. 12(*c*), the elevation angle φ can be expressed using an arc tangent function. In the present modified example, as illustrated in FIG. 12(*a*), an example in which a total of 24 elevation angles φ are defined is illustrated.

Figure 13A:
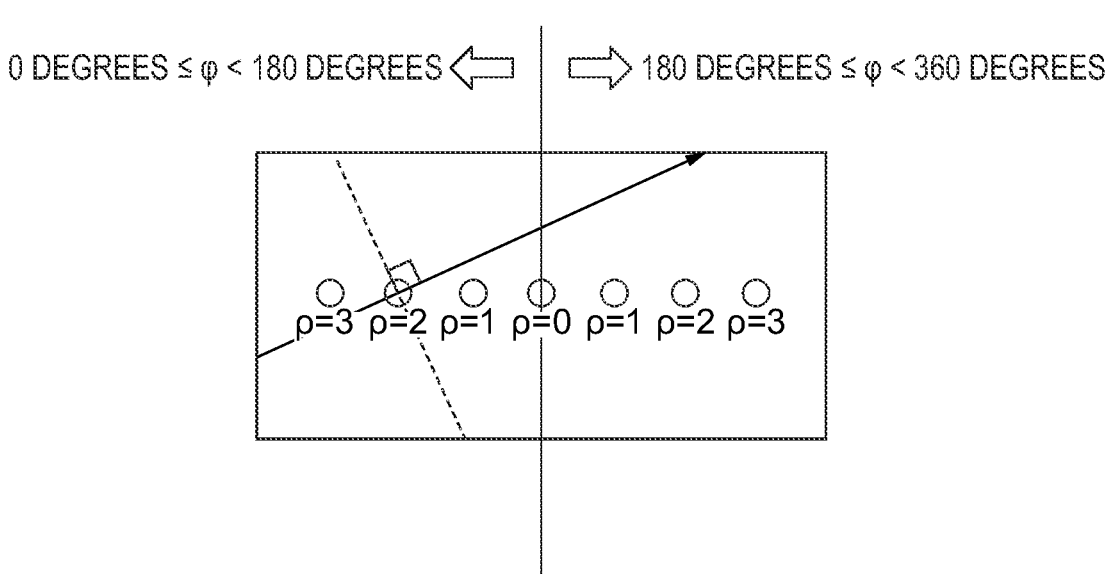
FIG. 13 is a diagram illustrating an example of a position (distance ρ) defining a geometric block partitioning pattern according to a modified example.
Figure 13B:
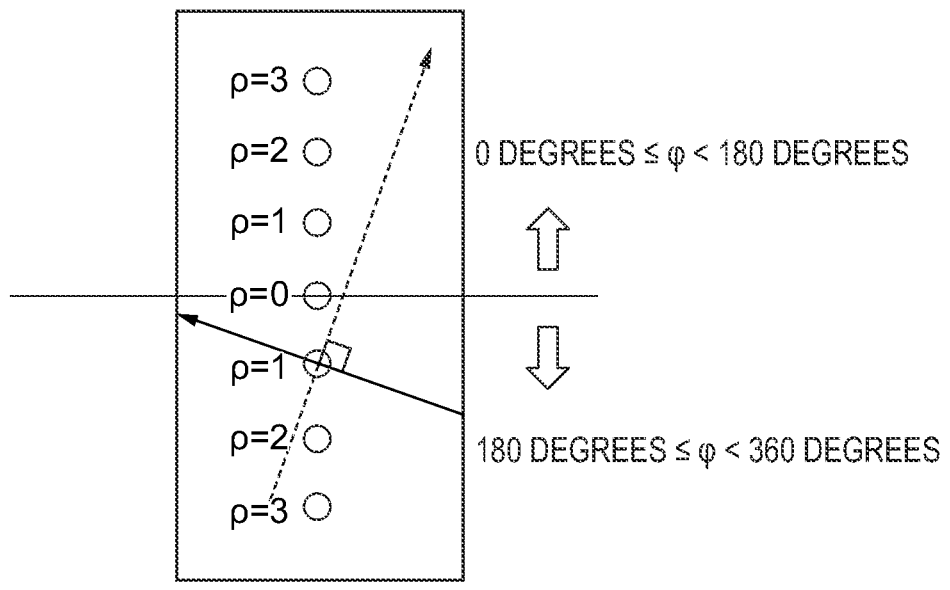

Modified Example 3: Method of Defining Position (Distance ρ) of Partitioning Boundary Line Hereinafter, Modified Example 3 of the present invention will be described focusing on differences from the first embodiment and Modified Examples 1 and 2 described above with reference to FIG. 13. FIG. 13 is a diagram illustrating a modified example of the position (distance p) defining the above-described geometric block partitioning pattern.

In Modified Examples 1 and 2 described above, the distance ρ is defined as a perpendicular distance from the central point of the target block to the partitioning boundary line. However, in the present modified example, as illustrated in FIG. 13, the distance ρ may be defined as a predetermined distance (predetermined position) from the central point in the horizontal direction or the vertical direction, the predetermined distance including the central point.

In the example of FIG. 13, two distances ρ are defined according to the block aspect ratio of the target block.

First, as illustrated in FIG. 13(*a*), the distance ρ may be defined only in the horizontal direction for a horizontally long block.

Secondly, as illustrated in FIG. 13(*b*), the distance ρ may be defined only in the vertical direction for a vertically long block.

However, as long as the elevation angle φ for the horizontally long block is 0 degrees (180 degrees) and as long as the elevation angle φ for the vertically long block is 90 degrees (270 degrees), the distances ρ in the vertical direction and the horizontal direction may be defined, respectively.

Note that the distance ρ may be defined in one or both of the horizontal direction and the vertical direction for a square block. Furthermore, for example, as illustrated in FIG. 13, the distance ρ may have a variation with respect to a predetermined distance (predetermined position) obtained by dividing the width or height of the target block into eight equal parts.

In the example of FIG. 13, the distance ρ is defined as a distance (position) obtained by multiplying the width or height of the target block by 0/8, 1/8, 2/8, or 3/8 in the horizontal direction (left-right direction) or the vertical direction (top-bottom direction) from the central point.

Here, the reason why the distances in the vertical direction and the horizontal direction (distances in a short side direction) are not defined for an elevation angle other than the elevation angle of 0 degrees (180 degrees) for the horizontally long block and the elevation angle of 90 degrees (270 degrees) for the vertically long block is that an effect of increasing the number of variations of the geometric block partitioning pattern by defining the distance ρ in the short side direction is smaller than an effect of increasing the number of variations of the geometric block partitioning pattern by defining the distance ρ in a long side direction.

As illustrated in FIG. 13, the partitioning boundary line in the geometric block partitioning can be designed as a line that is perpendicular to the elevation angle φ and passes through the partitioning boundary line and a point at the predetermined distance (predetermined position) p defined as described above.

Note that Modified Example 3 can be combined with Modified Example 2 described above, and the perpendicular lines with respect to the distance ρ described above are the same, that is, the partitioning boundary lines are the same for a pair of elevation angles φ of 180 degrees.

Therefore, for example, by limiting the use of each of the elevation angle φ within a range of 0 degrees or more and less than 180 degrees and the elevation angle φ within a range of 180 degrees or more and less than 360 degrees for the distance ρ in the left-right direction or the top-bottom direction with the central point on line symmetry as illustrated in FIG. 13, it is possible to avoid overlapping of the geometric block partitioning patterns.

Since a combination of the ranges of the elevation angle φ and the distances ρ in the horizontal direction (left-right direction) and the vertical direction (top-bottom direction) indicates the same variation of the geometric block partitioning pattern even when reversed, the implementation may be freely changed based on the designer's intention.

Figure 14A:
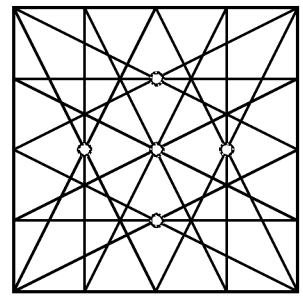
FIG. 14 is a diagram illustrating an example of a method of defining an elevation angle φ and a distance ρ according to a modified example.
Figure 14B:
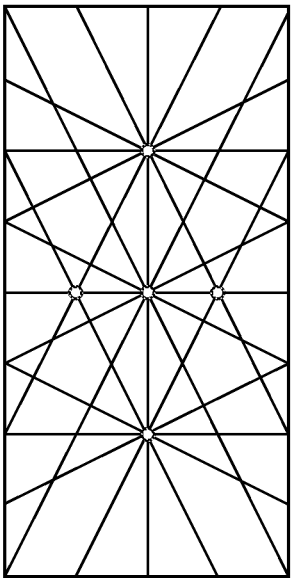
Figure 14C:
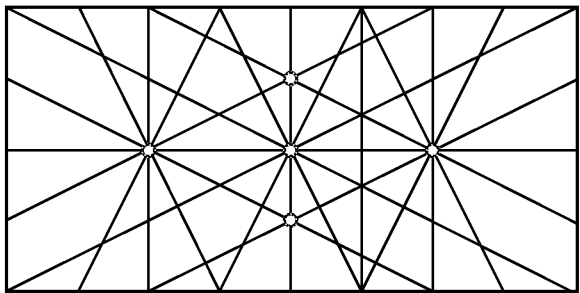

Modified Example 4: Change of Method of Defining Elevation Angle φ and Position (Distance) ρ, and Reduction of Variations Hereinafter, Modified Example 4 of the present invention will be described focusing on differences from the first embodiment and Modified Examples 1 to 3 described above with reference to FIGS. 14 to 15. FIG. 14 is a diagram illustrating a modified example regarding the method of defining the elevation angle φ and the distance p.

In Modified Example 2 described above, the method of defining the elevation angle φ by using the block aspect ratio has been described, and in Modified Example 3 described above, the method of defining the distance (position) ρ by using the predetermined distances (predetermined positions) in the horizontal direction and the vertical direction from the central point has been described.

In the present modified example, in order to simplify the implementation of the elevation angle φ and the distance (position) ρ, as illustrated in FIGS. 14(*a*) to 14(*c*), a line passing through a point at a predetermined distance (position) ρ and the elevation angle φ may be defined as the partitioning boundary line itself.

Furthermore, in order to reduce the geometric block partitioning pattern, the number of variations of the distance ρ and the number of variations of the elevation angle φ may be reduced as illustrated in FIGS. 14(*a*) to 14(*c*).

Specifically, in FIGS. 14(*a*) to 14(*c*), the variations of the distance ρ described in Modified Example 3 described above is limited to two types, that is, 0/8 times and 2/8 times of the width or height of the target block.

Furthermore, in the examples of FIGS. 14(*a*) to 14(*c*), possible values of the variations of the elevation angle φ are limited according to the position through which the partitioning boundary line passes and the block aspect ratio of the target block. Accordingly, in the examples of FIGS. 14(*a*) to

14(*c*), the number of variations of the geometric block partitioning pattern is limited to 16 in total.

(Method of Specifying Geometric Block Partitioning Pattern)

Figure 15:
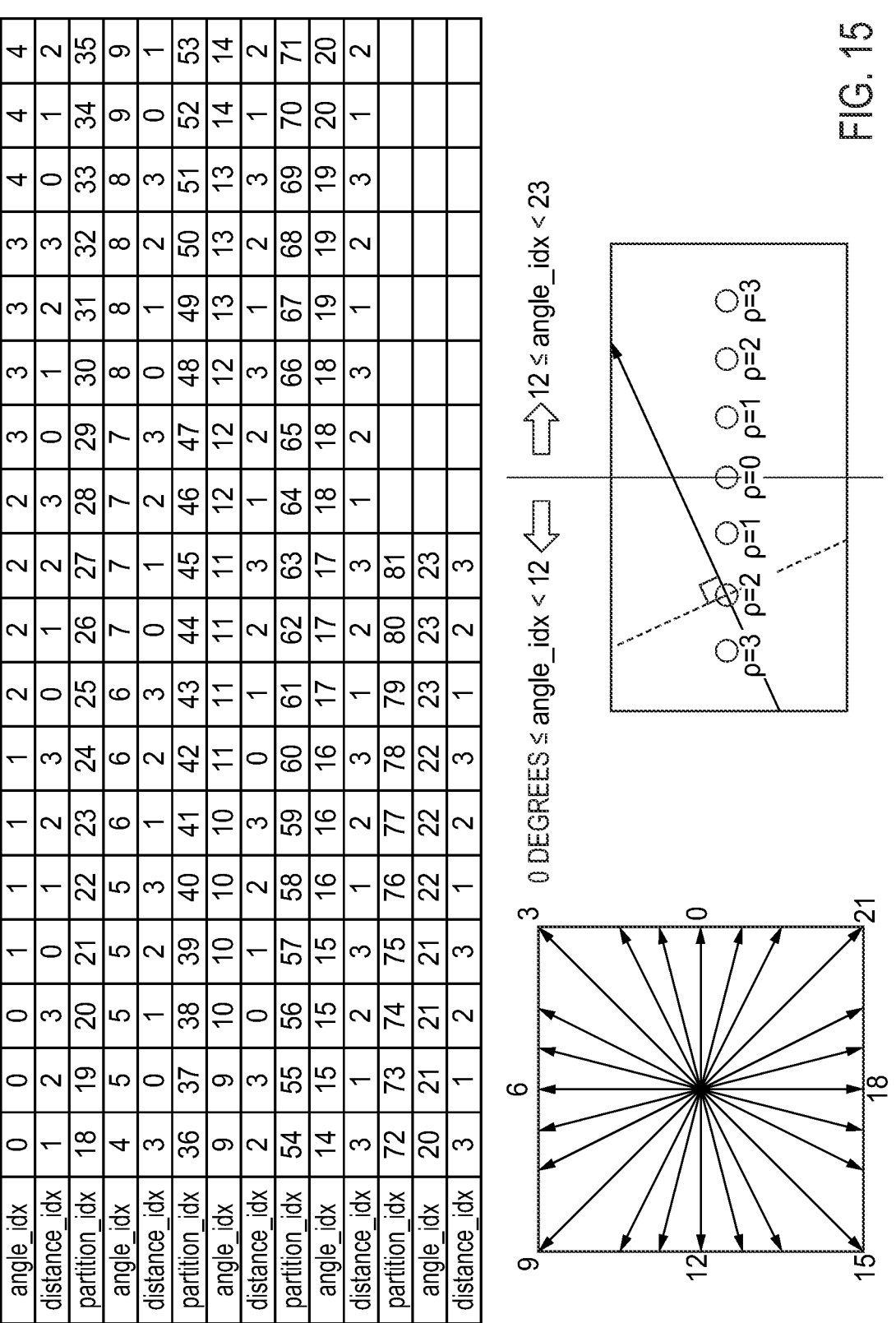
FIG. 15 is a diagram illustrating an example of an index table showing a combination of the elevation angle φ and the distance (position) ρ that define a geometric block partitioning pattern according to the modified example.

Hereinafter, a method of specifying the geometric block partitioning pattern will be described with reference to FIG. 15. FIG. 15 is a diagram illustrating an example of an index table showing a combination of the elevation angle φ and the distance (position) ρ that define the geometric block partitioning pattern described above.

In FIG. 15, the elevation angle φ and the distance p that define the geometric block partitioning pattern are associated with "angle_idx" and "distance_idx", respectively, and a combination thereof is defined by "partition_idx".

For example, as described in the table of FIG. 12, the elevation angle φ and the distance ρ described in Modified Examples 2 and 3 described above are defined as integers of 0 to 23 and 0 to 3 in "angle_idx" and "distance_idx", respectively, and "partition_idx" indicating the combination thereof is decoded, such that the elevation angle φ and the distance ρ are uniquely determined, and thus the geometric block partitioning pattern can be uniquely specified.

The image coding device 100 and the image decoding device 200 hold index tables indicating the geometric block partitioning pattern, the image coding device 100 transmits, to the image decoding device 200, "partition_idx" corresponding to the geometric block partitioning pattern with the lowest coding cost when the geometric block partitioning is enabled, and the geometric block partitioning unit 241A22 of the image decoding device 200 decodes "partition_idx".

Modified Example 5: Control of Method of Decoding "Partition_Idx" According to Size or Aspect Ratio of Target Block5

Figure 16:
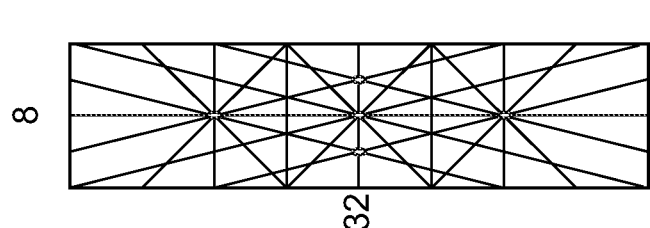
FIG. 16 is a diagram for describing an example of a control of a method of decoding "partition_idx" according to a block size or a block aspect ratio of a target block according to a modified example.
Figure 16:
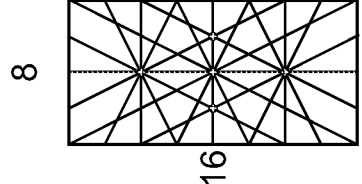
Figure 16:
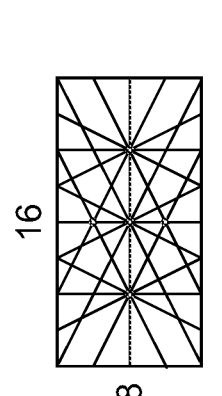
Figure 16:
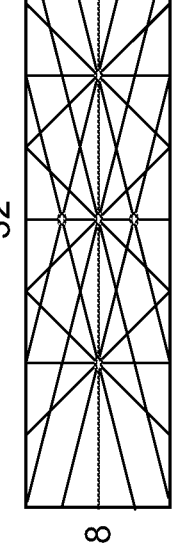
Figure 16:
Figure 16:
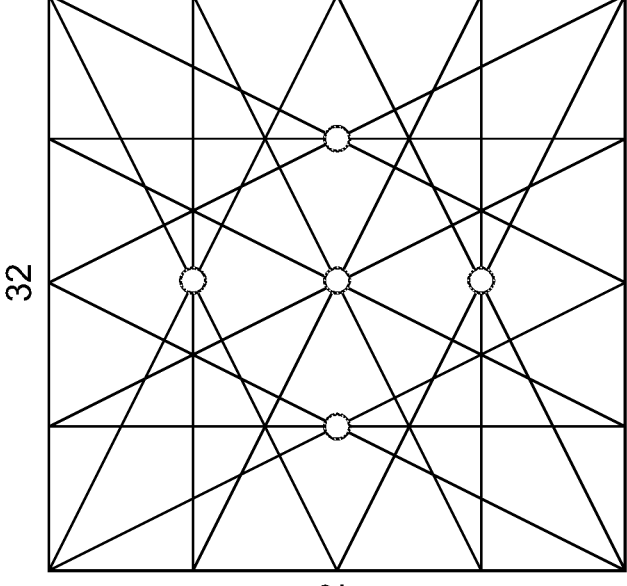

Hereinafter, Modified Example 5 of the present invention will be described focusing on differences from the first embodiment and Modified Examples 1 to 4 described above with reference to FIG. 16. FIG. 16 is a diagram for describing an example of a control of a method of decoding "partition_idx" according to the block size or the block aspect ratio of the target block.

In the above example, the method of decoding "partition_idx" (the method of specifying the geometric block partitioning pattern using the fixed index table) that does not depend on the block size or the block aspect ratio of the target block has been described as an example of the method of specifying the geometric block partitioning pattern.

On the other hand, in the present modified example, a method of controlling the method of decoding "partition_idx" according to the block size or the aspect ratio of the target block to further increase coding efficiency is considered as follows.

Focusing on the block size or the aspect ratio of the target block, as illustrated in FIG. 16, in a relatively small block such as an 8×8 pixel block and a relatively large block such as a 32×32 pixel block, the density of the partitioning boundary lines with respect to the area of the block may be different even in a case where the number of variations of the partitioning boundary line is the same.

Similarly, as illustrated in FIG. 16, it is also conceivable that the density of the partitioning boundary lines described above is different between the horizontal and vertical directions of the horizontally long block and the vertically long block.

In such a case, for example, the index table used to specify the elevation angle φ and the distance ρ from "partition_idx"

may be changed according to the block size or the block aspect ratio of the target block.

For example, for the target block having a small block size, an index table in which the number of geometric block partitioning patterns is small, that is, a maximum value of "partition_idx" is small is used, and for the target block having a large block size, an index table in which the number of geometric block partitioning patterns is large, that is, the maximum value of "partition_idx" is large is used, whereby the coding efficiency can be improved as compared with the above example using the fixed index table.

Furthermore, a correlation between the block size and the number of geometric block partitioning patterns (a proportional relationship between the block size and the number of geometric block partitioning patterns) may be reversed.

In other words, for the target block having a small block size, an index table in which the number of geometric block partitioning patterns is large, that is, the maximum value of "partition_idx" is large may be used, and for the target block having a large block size, an index table in which the number of geometric block partitioning patterns is small, that is, the maximum value of "partition_idx" is small may be used.

In a case where the block size of the target block and the number of geometric block partitioning patterns are in a proportional relationship, the density of the partitioning boundary lines can be made uniform even in a case where the block size of the target block is different.

Therefore, an effect that a probability that the partitioning boundary line in the geometric block partitioning is aligned with respect to the object boundary generated in the target block is made uniform for each block size can be expected.

On the other hand, in a case where the block size of the target block and the number of geometric block partitioning patterns are in an inversely proportional relationship, the above-described effect cannot be expected, but an effect of further increasing the probability that the partitioning boundary line is aligned with respect to the object boundary can be expected by limiting the block size to a small size.

Generally, in a natural image, a portion where the object boundary runs complicatedly (appears in a plurality of arbitrary directions) is often coded as a small block, and on the other hand, in a case where the object boundary appears in a direction close to the horizontal or vertical direction, an error from rectangular block partitioning is small, and thus, a portion where the object boundary appears is often coded as a large block.

Therefore, based on this idea, an effect of further increasing the probability that the partitioning boundary line is aligned with respect to the object boundary can be expected by increasing the number of geometric block partitioning patterns for a small block, and as a result, an effect of reducing the prediction error can be expected.

Similarly, for the horizontally long block, the number of geometric block partitioning patterns may be increased in the horizontal direction, and conversely, the number of geometric block partitioning patterns may be decreased in the vertical direction.

On the other hand, for the vertically long block, the number of geometric block partitioning patterns may be increased in the horizontal direction, and conversely, the number of geometric block partitioning patterns may be decreased in the vertical direction.

Furthermore, the correlation between the block aspect ratio and the number of geometric block partitioning patterns may be reversed as described in the above description of the block size and the number of geometric block partitioning patterns.

In other words, for the horizontally long block, the number of geometric block partitioning patterns may be decreased in the horizontal direction, and conversely, the number of geometric block partitioning patterns may be increased in the vertical direction.

On the other hand, for the vertically long block, the number of geometric block partitioning patterns may be decreased in the horizontal direction, and conversely, the number of geometric block partitioning patterns may be increased in the vertical direction.

The reason for reversing the correlation in this manner is the same as the idea shown in the description of the correlation between the block size and the number of geometric block partitionings, and thus a description thereof will be omitted.

Note that a method of controlling the number of geometric block partitioning patterns according to the block aspect ratio can be implemented by changing the used index table, similarly to the above-described case.

As another implementation example, it is conceivable to limit the range of the value of "partition_idx" that can be decoded on the index table according to the block size or the aspect ratio of the target block although the index table itself is fixed.

Since the code length is not shortened, such limitation does not contribute to improvement in coding efficiency, but from the viewpoint of the image coding device 100, a process up to calculation of costs for an unnecessary geometric block partitioning pattern can be omitted, which can contribute to an increase in coding processing speed.

Second Embodiment

Hereinafter, a second embodiment of the present invention will be described focusing on differences from the first embodiment described above with reference to FIGS. 17 to 22.

(Motion Information Availability Checking Processing)

Hereinafter, motion information availability checking processing according to the present embodiment will be described.

As described above, the motion information availability checking processing is a first processing step included in the merge list construction processing.

Specifically, the motion information availability checking processing checks whether or not the motion information is present in the reference block spatially or temporally adjacent to the target block. Here, the known method described in Non Patent Literature 1 can be used as a method of checking the motion information in the present embodiment, and thus a description thereof will be omitted.

(Motion Information Registration/Pruning Processing for Merge List)

Hereinafter, the motion information registration/pruning processing for the merge list according to the present embodiment will be described with reference to FIG. 17.

Figure 17:
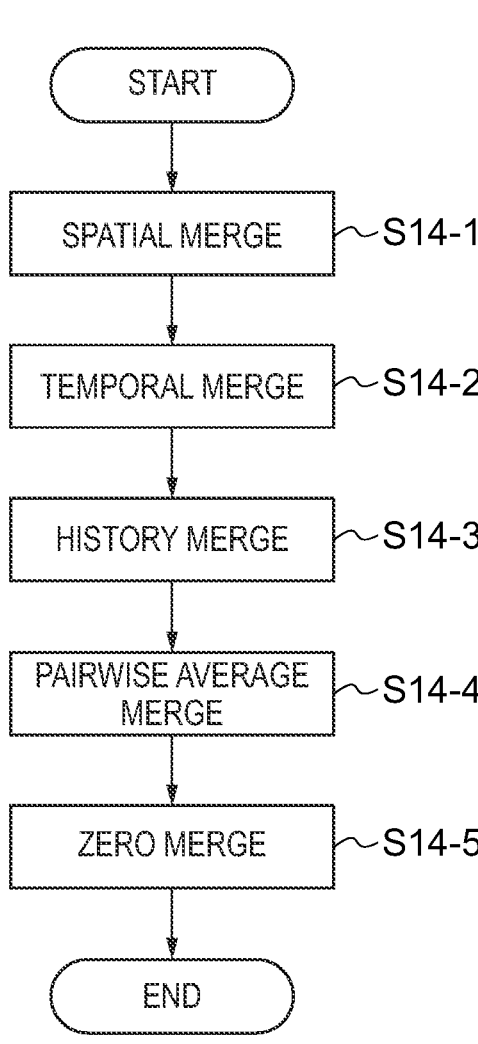
FIG. 17 is a flowchart illustrating an example of motion information registration/pruning processing for a merge list according to an embodiment.

FIG. 17 is a flowchart illustrating an example of the motion information registration/pruning processing for the merge list according to the present embodiment.

As illustrated in FIG. 17, the motion information registration/pruning processing for the merge list according to the present embodiment may be configured by a total of five motion information registration/pruning processings as in Non Patent Literature 1.

Specifically, the motion information registration/pruning processing may include spatial merge in Step S14-1, temporal merge in Step S14-2, history merge in Step S14-3, pairwise average merge in Step S14-4, and zero merge in Step S14-5. Details of each processing will be described later.

FIG. 18 is a diagram illustrating an example of the merge list constructed as a result of executing the motion information registration/pruning processing for the merge list. As described above, the merge list is a list in which the motion information corresponding to the merge index is registered.

Here, the maximum number of merge indexes is set to five in Versatile Video Coding (Draft 7), JVET-N 1001, but may be freely set according to the designer's intention.

In addition, mvL0, mvL1, RefIdxL0, and RefIdxL1 in FIG. 18 indicate the motion vectors and the reference image indexes of reference image lists L0 and L1, respectively.

Here, the reference image lists L0 and L1 indicate lists in which the reference frames are registered, and the reference frames are specified by RefIdx.

Note that, although the motion vectors and the reference image indexes of both L0 and L1 are shown in the merge list illustrated in FIG. 18, there is a case where the prediction is the uni-prediction depending on the reference block.

In such a case, one (uni-prediction) motion vector and one reference image index are registered in the list. Note that, in a case where it is checked that the motion information is not present in the reference block by the above-described motion information availability checking processing at a preceding stage of each processing of Steps S15-1 to S15-4, each processing is skipped.

(Spatial Merge)

Figure 19:
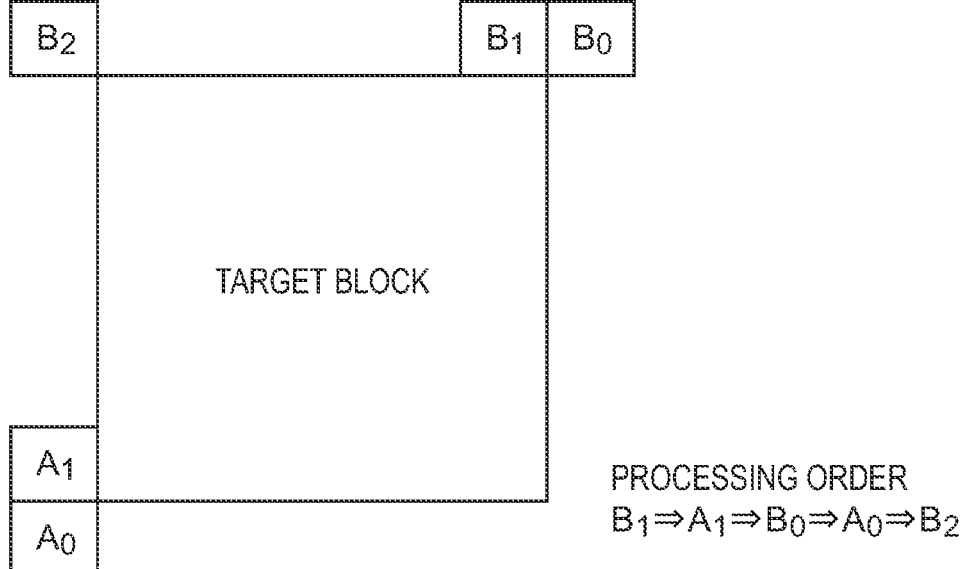
FIG. 19 is a diagram for describing spatial merge according to the embodiment.

FIG. 19 is a diagram for describing the spatial merge.

The spatial merge is a technique in which the mv, RefIdx, and hpelIfIdx are inherited from adjacent blocks present in the same frame as that of the target block.

Specifically, the merge list construction unit 241A23 is configured to inherit the mv, Refidx, and hpelfIdx described above from the adjacent blocks that are in the positional relationship as illustrated in FIG. 15 and register the same in the merge list. Similarly to Non Patent Literature 1, the processing order may be $B_1 => A_1 => B_0 => A_0 => B_2$ as illustrated in FIG. 19.

(Motion Information Pruning Processing)

Note that the motion information registration processing for the merge list may be executed in the above-described processing order, and the motion information pruning processing may be implemented so that the same motion information as the already-registered motion information is not registered in the merge list, similarly to Versatile Video Coding (Draft 7), JVET-N 1001.

An object of implementing the motion information pruning processing is to increase variations of the motion information registered in the merge list, and from the viewpoint of the image coding device 100, it is possible to select the motion information with the lowest predetermined cost in accordance with image characteristics.

On the other hand, the image decoding device 200 can generate the prediction signal with high prediction accuracy by using the motion information selected by the image coding device 100, and as a result, an effect of improving the coding performance can be expected.

In the motion information pruning processing for the spatial merge, for example, in a case where the motion information corresponding to $B_1$ is registered in the merge list, the sameness with the registered motion information corresponding to $B_1$ is checked at the time of executing the next processing of registering the motion information corresponding to $A_1$. Here, the checking of the sameness with the motion information is a comparison of whether or not the my and RefIdx are the same. Here, once the sameness is confirmed, the motion information corresponding to $A_1$ is not registered in the merge list.

Note that the motion information corresponding to $B_0$ is compared with the motion information corresponding to $B_1$, the motion information corresponding to $A_0$ is compared with the motion information corresponding to $A_1$, and the motion information corresponding to $B_2$ is compared with the motion information corresponding to $B_1$ and $A_1$. Note that, in a case where there is no motion information corresponding to a position to be compared, checking of the sameness may be skipped, and the corresponding motion information may be registered.

Furthermore, in Non Patent Literature 1, the maximum number of registerable merge indexes by the spatial merge is set to four, and as for the adjacent block $B_2$, in a case where four pieces of motion information have already been registered in the merge list by the spatial merge processing so far, the processing for the adjacent block $B_2$ is skipped. In the present embodiment, similarly to Non Patent Literature 1, the processing for the adjacent block $B_2$ may be determined based on the number of already registered motion information.

(Time Merge)

Figure 20:
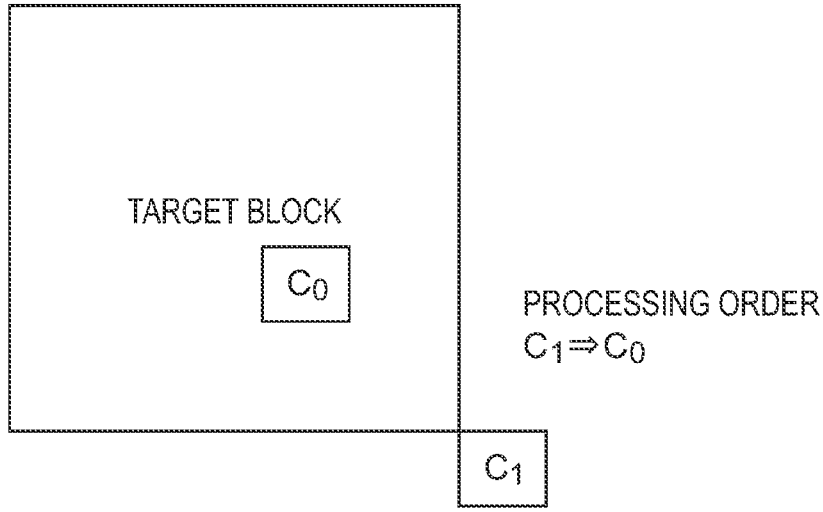
FIG. 20 is a diagram for describing temporal merge according to the embodiment.

FIG. 20 is a diagram for describing the temporal merge.

The temporal merge is a technique in which an adjacent block ($C_1$ in FIG. 17) at a position on a left-lower side of the same position or a block ($C_0$ in FIG. 17) at the same position, which is present in a frame different from that of the target block, is specified as the reference block, and the motion vector and the reference image index are inherited.

The maximum number of pieces of motion information registered in a time merge list is one in Versatile Video Coding (Draft 7), JVET-N 1001, and in the present embodiment, a similar value may be used or the maximum number of pieces of motion information registered in the time merge list may be changed according to the designer's intention.

Figure 21:
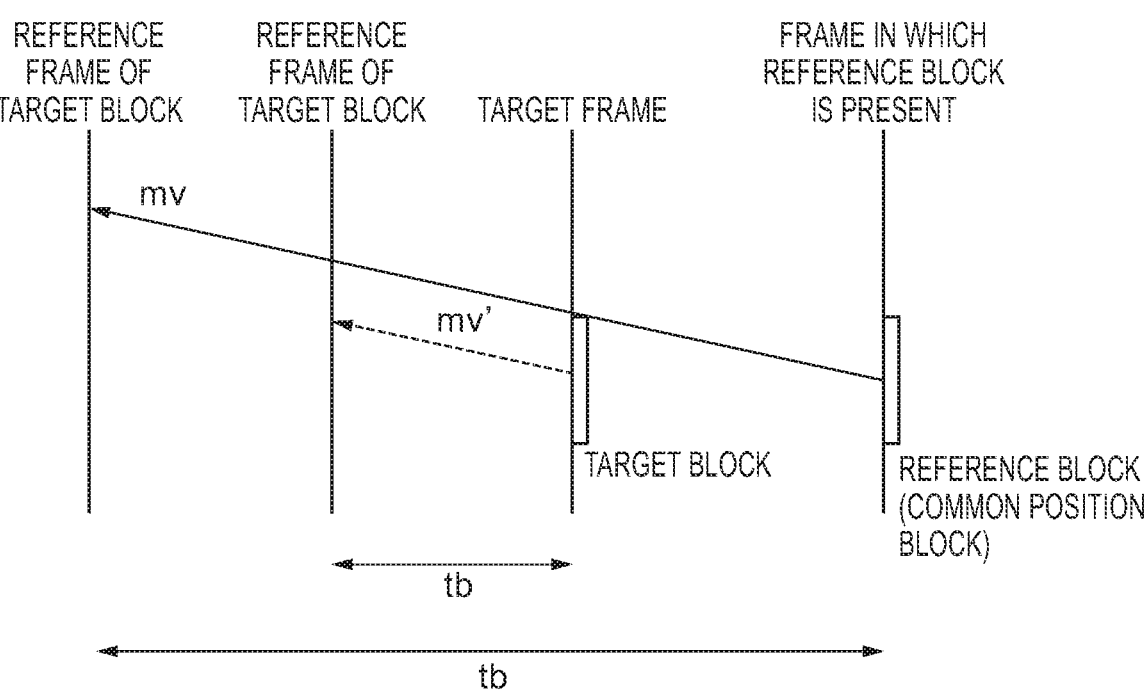
FIG. 21 is a diagram for describing an example of scaling processing for a motion vector inherited in the temporal merge according to the embodiment.

The motion vector inherited in the temporal merge is scaled. FIG. 21 is a diagram illustrating scaling processing.

Specifically, as illustrated in FIG. 21, the my of the reference block is scaled as follows based on a distance tb between the reference frame of the target block and a frame in which the target frame is present and a distance td between the reference frame of the reference block and the reference frame of the reference block.

$$mv'=(td/tb) \times mv$$

In the temporal merge, the scaled my' is registered in the merge list as the motion vector corresponding to the merge index.

(History Merge)

FIG. 22 is a diagram for describing the history merge.

The history merge is a technique in which the motion information of the inter prediction block coded in the past before the target block is separately recorded in a recording region called a history merge table, and in a case where the number of pieces of registered motion information registered in the merge list has not reached the maximum at the end of the spatial merge processing and temporal merge processing described above, the pieces of motion information registered in the history merge table are sequentially registered in the merge list.

FIG. 22 is a diagram illustrating an example of processing of registering the motion information in the merge list based on the history merge table.

The motion information registered in the history merge table is managed by a history merge index. The maximum number of pieces of registered motion information is six in Non Patent Literature 1, and a similar value may be used or the maximum number of pieces of registered motion information may be changed according to the designer's intention.

In addition, the processing of registering the motion information in the history merge table employs FIFO processing in Non Patent Literature 1. That is, in a case where the number of pieces of registered motion information in the history merge table has reached the maximum number, the motion information associated with the latest registered history merge index is deleted, and the motion information associated with the new history merge index is sequentially registered.

Note that the motion information registered in the history merge table may be initialized (all the motion information may be deleted from the history merge table) in a case where the target block crosses the CTU, similarly to Versatile Video Coding (Draft 7), JVET-N 1001.

(Pairwise Average Merge)

The pairwise average merge is a technique of generating new motion information by using pieces of motion information associated with two sets of merge indexes already registered in the merge list, and registering the new motion information in the merge list.

As for the two sets of merge indexes used for the pairwise average merge, similarly to Versatile Video Coding (Draft 7), JVET-N 1001, the 0-th merge index and the first merge index registered in the merge list may be used in a fixed manner, or another two sets of merge indexes may be used according to the designer's intention.

In the pairwise average merge, the pieces of motion information associated with two sets of merge indexes already registered in the merge list are averaged to generate new motion information.

Specifically, for example, in a case where there are two motion vectors corresponding to each of two sets of merge indexes (that is, in a case of bi-prediction), the motion vectors mvL0Avg/mvL1Avg of the pairwise average merge are calculated as follows by the motion vectors $mvL0P_0$/ $mvL0P_1$ and $mvL1P_0$/$mvL1P_1$ in L0 and L1 directions.

$$mvL0Avg=(mvL0P_0+mvL0P_1)/2$$

$$mvL1Avg=(mvL1P_0+mvL1P_1)/2$$

Here, in a case where any of $mvL0P_0$ and $mvL1P_0$ or $mvL0P_1$ and $mvL1P_1$ does not exist, a vector that does not exist is calculated as a zero vector as described above.

At this time, in Versatile Video Coding (Draft 7), JVET-N 1001, it is determined to always use a reference image index $RefIdxL0P_0$/$RefIdxL0P_1$ in which a reference image index associated with a pairwise average merge index is associated with a merge index $P_0$.

(Zero Merge)

The zero merge is processing of adding a zero vector to the merge list in a case where the number of pieces of registered motion information in the merge list has not reached the maximum number at the time when the pairwise average merge processing described above ends. As for the registration method, the known method described in Versatile Video Coding (Draft 7), JVET-N 1001 can be used in the present embodiment, and thus a description thereof will be omitted.

(Motion Information Decoding Processing From Merge List)

The merge list construction unit 241A23 is configured to decode the motion information from the merge list constructed after the end of the motion information registration/ pruning processing described above.

For example, the merge list construction unit 241A23 is configured to select and decode the motion information from the merge list, the motion information corresponding to the merge index transmitted from the merge list construction unit 111A23.

On the other hand, although not illustrated, the merge index is selected by the merge list construction unit 111A23 in a manner in which the motion information with the lowest coding cost is transmitted to the merge list construction unit 241A23.

Here, since the merge index that has been registered earlier in the merge list, that is, the merge index that has a smaller index number has a smaller code length (lower coding cost), the merge index with a smaller index number tends to be easily selected by the merge list construction unit 111A23.

Here, in the merge list construction unit 241A23, in a case where the geometric block partitioning merge is disabled, one merge index is decoded for the target block, but in a case where the geometric block merge is enabled, two different merge indexes m/n are decoded since there are two regions m/n across the geometric block partitioning boundary for the target block.

For example, by decoding such merge indexes m/n as follows, it is possible to assign different merge indexes to m/n even in a case where the merge indexes for m/n transmitted from the merge list construction unit 111A2 are the same.

$$m=merge\_idx0[xCb][yCb]$$

$$n=merge\_idx1[xCb][yCb]+(merge\_idx1[xCb][yCb]$$
$$>=m)?1:0$$

Here, xCb and yCb are position information of a pixel value positioned at the uppermost left side of the target block.

Note that merge_idx1 does not have to be decoded in a case where the maximum number of merge candidates of the geometric block partitioning merge is two or less. This is because, in a case where the maximum number of merge candidates of the geometric block partitioning merge is two or less, the merge index corresponding to merge_idx1 in the merge list is specified as another merge index different from the merge index selected by merge_idx0 in the merge list.

Modified Example 6: Control of Construction of Merge List when Geometric Block Partitioning Merge is Enabled Hereinafter, Modified Example 6 of the present invention will be described focusing on differences from the second embodiment described above with reference to FIGS. 23 and 24. Specifically, a control of construction of the merge list when the geometric block partitioning merge is enabled according to the present modified example will be described with reference to FIGS. 23 and 24.

Figure 23:
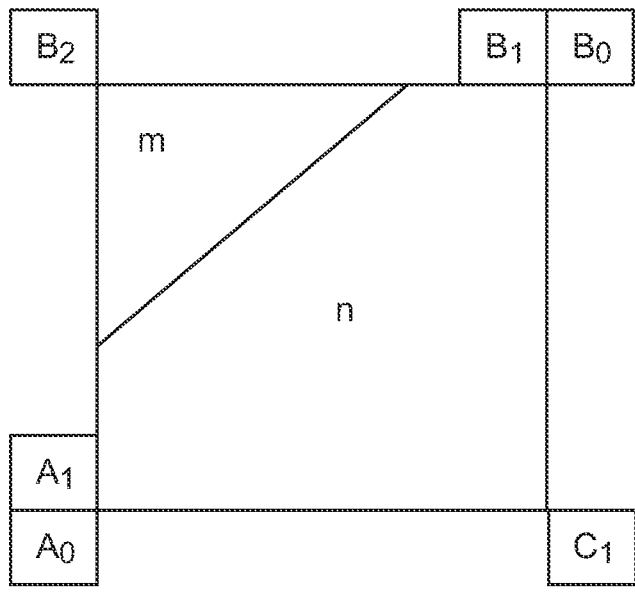
FIG. 23 is a diagram illustrating an example of a geometric block partitioning pattern in a target block when geometric block partitioning merge is enabled and an example of a positional relationship between spatial merge and temporal merge with respect to the target block according to a modified example.
Figure 24:
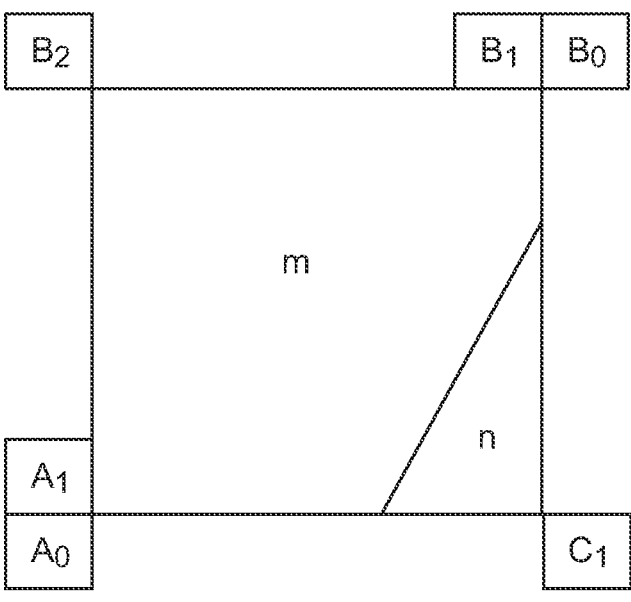
FIG. 24 is a diagram illustrating the example of the geometric block partitioning pattern in the target block when the geometric block partitioning merge is enabled and the example of the positional relationship between the spatial merge and the temporal merge with respect to the target block according to the modified example.

FIGS. 23 and 24 are diagrams illustrating an example of the geometric block partitioning pattern in the target block when the geometric block partitioning merge is enabled and the example of a positional relationship between the spatial merge and the temporal merge with respect to the target block.

In a case where the target block has the geometric block partitioning pattern illustrated in FIG. 23, adjacent blocks having the motion information closest to two regions m/n across the block partitioning boundary line are $B_2$ for m and $B_1$, $A_1$, $A_0$, $B_0$, and $C_1$ for n.

Furthermore, in a case where the target block has the geometric block partitioning pattern illustrated in FIG. 21, adjacent blocks having the motion information closest to two regions m/n across the partitioning boundary are $C_1$ for m, and $B_1$, $A_0$, $A_1$, $B_0$, and $B_2$ for n.

In a case where the geometric block partitioning is enabled, an effect of improving the prediction accuracy can be expected by facilitating registration of the motion information of the adjacent block closest to the above-described m/n in the merge list.

Furthermore, from the viewpoint of improving the prediction accuracy, an effect of further improving the prediction accuracy can be expected by lowering merge list registration priorities of the motion information at spatially similar positions such as $B_1/B_0$ and $A_1/A_0$ and adding the motion information at different spatial positions such as $B_2$ and $C_1$ to the merge list.

In addition, as described above, in a case where the motion information of the closest adjacent block is registered as the merge index with a smaller index number in the merge list, the coding efficiency can be improved.

In the above-described configuration, for example, in a case where the pieces motion information whose merge list registration priorities are to be changed are the pieces of motion information of $B_0$ and $A_0$, even when it is checked that the pieces of motion information are present at these positions in the motion information availability checking processing, the pieces of motion information are treated as unavailable, such that it is possible to increase a probability of registering the pieces of motion information corresponding to $B_2$ and $C_1$ subsequent to $B_0$ and $A_0$ to the merge list.

Modified Example 7: Other Methods of Changing Registration Priority of Motion Information Hereinafter, Modified Example 7 of the present invention will be described focusing on differences from the second embodiment and Modified Example 6 described above. In Modified Example 6 described above, in the processing of changing the registration priority of the motion information when the geometric block partitioning merge is enabled, the pieces of motion information at predetermined positions, for example, $B_0$ and $A_0$, in the spatial merge processing are treated as unavailable even in a case where the motion information is present or the non-sameness with the already-registered motion information is confirmed, such that it is possible to indirectly increase the probability (priority) of registration of the subsequent spatially or temporally adjacent motion information, for example, the motion information of $B_2$ or $C_1$ ($C_0$).

Meanwhile, other means for changing the registration priority of the motion information will be described below.

For example, the processing order of the spatial merge in Step S14-1 and the temporal merge in Step S14-2 of the merge list illustrated in FIG. 17 may be decomposed to directly change the registration order of the motion information. For example, in a case where the geometric block partitioning merge is applied, $B_2$ of the spatial merge and the motion information $C_1$ or $C_0$ (hereinafter, referred to as Col) registered by the temporal merge are registered before $B_0$ and $A_0$ under the spatial merge processing.

For example, the following two implementation examples are conceivable.

Implementation Example 1: A Method of Branching the Merge List of the Regular Merge and the Merge List According to Whether or Not the Geometric Block Partitioning Merge is Applied

```
if ( !merge_geo_flag )
    i = 0
    if( availableFlagB1 )
        mergeCandList[ i++ ] = B1
    if( availableFlagA1 )
        mergeCandList[ i++ ] = A1
    if( availableFlagB0)
        mergeCandList[ i++ ] = B0
    if( availableFlagA0)
        mergeCandList[ i++ ] = A0
    if( availableFlagB2 )
        mergeCandList[ i++ ] = B2
    if( availableFlagC1 )
        mergeCandList[ i++ ] = Col
else
    i = 0
    if( availableFlagB1 )
        mergeCandList[ i++ ] = B1
    if( availableFlagA1 )
        mergeCandList[ i++ ] = A1
    if( availableFlagB2)
        mergeCandList[ i++ ] = B2
    if ( availableFlagC1
        mergeCandList[ i++ ] = Col
    if( availableFlagB0 )
        mergeCandList[ i++ ] = B0
    if( availableFlagA0 )
        mergeCandList[ i++ ] = A0
```

Here, merge_geo_flag is an internal parameter that holds a determination result as to whether or not the geometric block partitioning merge is applied. When the parameter is 0, the geometric block partitioning merge is not applied, and when the parameter is 1, the geometric block partitioning merge is applied.

Further, availableFlag is an internal parameter that holds a determination result of the above-described motion information availability checking processing for each merge candidate of the spatial merge and temporal merge. When the parameter is 0, the motion information is not present, and when the parameter is 1, the motion information is present.

Furthermore, mergeCandList indicates processing of registration of the motion information at each position. In the first if statement, it is determined whether or not the geometric block partitioning merge is applied by merge_geo_flag. In a case where it is determined that the geometric block partitioning merge is not applied, the merge list construction processing similar to the regular merge is started. In a case where it is determined that the geometric block partitioning merge is applied, the merge list construction processing of the geometric block partitioning merge in which switching from the regular merge to the motion information availability checking processing and the motion information registration/pruning processing is made is started.

Implementation Example 2: Method of Partially
Commonizing Merge List Construction of Regular
Merge and Geometric Block Partitioning Merge

```
i = 0
if( availableFlagB1 )
    mergeCandList[ i++ ] = B1
if( availableFlagA1 )
    mergeCandList[ i++ ] = A1
if( availableFlagB0 && !merge_geo_flag )
    mergeCandList[ i++ ] = B0
if( availableFlagA0 && !merge_geo_flag)
    mergeCandList[ i++ ] = A0
if ( availableFlagB2 )
    mergeCandList[ i++ ] = B2
if ( availableFlagC1 )
    mergeCandList[ i++ ] = Col
if( availableFlagB0 && merge_geo_flag )
    mergeCandList[ i++ ] = B0
if( availableFlagA0 && merge_geo_flag)
    mergeCandList[ i++ ] = A0
```

In Implementation Example 2, the total number of processing stages is larger as compared with Implementation Example 1. However, since the merge list for the geometric block partitioning merge is partially commonized with the regular merge list, there is an advantage that it is not necessary to have completely independent resources of a merge list construction processing circuit unlike Implementation Example 1.

In the configuration described above, the registration priorities of $B_2$ and Col are higher than those of $B_0$ and $A_0$. However, the registration priorities of $B_2$ and Col may be higher than those of $B_1$ and $A_1$. As another configuration example, for example, one of $B_2$ and Col may have a higher priority than those of $B_0$ and $A_0$, or may have a higher priority than those of $B_1$ and $A_1$.

Note that, in a case where $B_2$ is registered in the merge list earlier than $B_1$, $A_1$, $B_0$, and $A_0$, checking of sameness (comparison condition) with the motion information corresponding to $B_1$, $A_1$, $B_0$, and A for $B_2$ described above may be canceled. On the other hand, at the time of registering the motion information corresponding to $B_1$ and $A_1$, checking of sameness with the motion information corresponding to $B_2$ may be added.

Furthermore, in the above description, the method of changing the registration priority of the motion information during the merge list construction has been described, but the registration priority may be changed by a method described below after the merge list construction.

Specifically, when the motion information is registered in the merge list, merge processing and a position to which the registered motion information corresponds are used as internal parameters and stored until the motion vector is decoded (selected). As a result, the merge index number of the motion information corresponding to predetermined merge processing and a predetermined position, for example, the merge index number of the motion information registered by $B_0$ and A0 in the spatial merge is changed in order with the merge index number of Col in the temporal merge after the completion of the merge list construction, such that Col in the temporal merge can have a higher priority than those of $B_0$ and $A_0$ in the spatial merge (association with a small merge index number can be implemented). The above-described example of directly or indirectly changing the registration priority of the motion information may be implemented using a similar method.

As described above, as a secondary effect resulted from the change of the registration priority of the motion information after the merge list construction processing, the merge list construction processing when the geometric block partitioning merge is enabled can be commonized with the merge list construction processing in the regular merge.

Specifically, it is possible to commonize the processing order of the merge processing in the motion availability checking processing and the motion information registration/pruning processing in the merge list construction processing in the regular merge and the geometric block partitioning merge.

Modified Example 8: Change of Merge List
Construction Order According to Block Size Hereinafter, Modified Example 8 of the present invention will be described focusing on differences from the second embodiment and Modified Examples 6 and 7 described above.

In the above-described Modified Examples 6 and 7, the configuration in which the change of the registration priority of the motion information is determined based on a determination criterion that whether or not the geometric block partitioning merge is applied has been described.

On the other hand, in the present modified example, such a determination criterion may be determined based on the geometric block partitioning pattern, or may be determined based on the block size and the aspect ratio of the target block.

With such a configuration, the effect of further improving the prediction accuracy can be expected by also checking the geometric block partitioning pattern and changing the registration priority of the motion information of the merge list.
(Method of Selecting (Decoding) Two Different Pieces of Motion Information)

Hereinafter, a method of selecting (decoding) two pieces of different motion information when the geometric block partitioning merge is enabled according to the present embodiment will be described.

It has been described above that the target block has two different pieces of motion information across the partitioning boundary line when the geometric block partitioning merge is enabled. As for the two different pieces of motion information, the coding device 100 selects one with the lowest coding cost from the merge list described above, the merge index number of the merge list is designated using two merge indexes merge_geo_idx0 and merge_geo_idx1 for each partitioning region m/n, and transmitted to the image decoding device 200, and the corresponding motion information is decoded.

On the other hand, in a case where two pieces of motion information are registered for the designated merge index number, specifically, in a case where the adjacent block registered in the merge processing described above is for bi-prediction (having the motion information for each of L0 and L1), there is a possibility that the two pieces of motion information are registered for one merge index, and thus, it is necessary to select either one.

An example of the selection method will be described below.

For example, as one configuration example, there is a method in which the priority of the motion information to be decoded is set in advance in order of the number of the merge index of the merge list. Specifically, in the processing order of the merge index numbers, for example, even numbers 0, 2, and 4 give priority to decoding the motion information registered in the merge index for L0, and odd numbers 1, 3, and 5 of the merge index give priority to decoding the motion information registered for L1.

In the configuration example described above, in a case where there is no corresponding motion information of L0 or L1 for each number order, the motion information of the other one that is present may be decoded. In addition, L0 and L1 for an even number and an odd number may be reversed.

Other configuration examples are also described below. For example, a distance of the reference frame indicated by the reference index corresponding to L0 and L1 to the target frame including the target block may be compared, and the motion information including the reference frame having the short distance may be preferentially decoded.

As described above, when the geometric block partitioning merge is enabled, in a case where two different pieces of motion information are registered in the merge list for the merge index of the partitioning region, the motion information including the reference frame close to the target frame is preferentially decoded, such that the prediction error reduction effect can be expected.

Note that, in a case where the distance between the reference frame and the target frame is the same for the two different pieces of motion information, as described above, the priority set in advance for the merge index number of the merge list, that is, the motion information registered for L0 may be prioritized for the even numbers 0, 2, and 4, and the motion information registered for L1 may be prioritized for the odd numbers 1, 3, and 5.

Based on a picture order count (POC: Picture Order Count) of the target frame, the distance to the reference frame included in L0 and L1 is the same, and thus the priority may be determined as described above.

Alternatively, as the merge index number of the merge list, a list reverse to the one selected as the first previous index number may be selected. For example, in a case where L0 is selected as the 0-th merge index of the merge list, L1 that is the reverse list may be selected as the first merge index of the merge list. Note that in a case where the distance between the frames is the same, L0 may be referred to for the 0th merge index of the merge list.

In the above configuration example, the motion information in which the distance between the target frame and the reference frame is short is preferentially decoded. However, the motion information in which the distance between the target frame and the reference frame is long may be preferentially decoded.

Further, the decoding priority of the motion information may be changed so that the motion information with the shorter distance and the motion information with the longer distance are decoded with two merge indexes merge_geo_idx0 and merge_geo_idx1 for each partitioning region m/n.

(Prediction Signal Generation Processing in Geometric Block Partitioning Merge)

Hereinafter, a prediction signal generation processing method when the geometric block partitioning merge is enabled according to the present embodiment will be described.

It has been described above that the target block has two different pieces of motion information across the partitioning boundary line when the geometric block partitioning merge is enabled. At this point, a weighted average (blending) of motion compensation prediction signals generated based on the two different motion vectors is calculated with a weight depending on the distance from the partitioning boundary line for the target block, such that an effect of smoothing the pixel value with respect to the partitioning boundary line can be expected.

As for the above-described weight, for example, in a case where the image coding device 100 and the image decoding device 200 have one weight table (blending table) for one geometric block partitioning pattern, and the geometric block partitioning pattern can thus be specified, blending processing suitable for the geometric block partitioning pattern can be implemented.

According to the above-described embodiment, an appropriate block partitioning shape is selected for the object boundary appearing in an arbitrary direction by applying the geometric block partitioning merge to the target block divided in a rectangular shape, thereby making it possible to implement the coding performance improvement effect by reduction of the prediction error and implement the subjective image quality improvement effect by selection of an appropriate block partitioning boundary for the object boundary.

Note that the merge list construction unit 111A2 may be configured to treat the above-described motion information as unavailable regardless of the presence or absence of the motion information for predetermined merge processing at the time of executing the motion information availability checking processing according to whether or not the geometric block partitioning merge is applied.

In addition, the merge list construction unit 111A2 may be configured to treat the motion information for the predetermined merge processing as a pruning target regardless of the sameness with the motion information already registered in the merge list, that is, not to newly register the motion information for the predetermined merge processing in the merge list, at the time of executing the motion information registration/pruning processing, according to whether or not the geometric block partitioning merge is applied.

The foregoing image encoding device 100 and the image decoding device 200 may also be realized by a program that causes a computer to perform each function (each process).

Note that, in each of the foregoing embodiments, the present invention has been described by taking application to the image encoding device 100 and the image decoding device 200 by way of an example; however, the present invention is not limited only to such devices and can be similarly applied to encoding/decoding systems provided with each of the functions of an encoding device and a decoding device.

What is claimed is:

1. An image decoding device comprising:
    a merge unit configured to apply geometric block partitioning merge to a target block divided in a rectangular shape, wherein
    the merge unit includes:
        a merge mode specifying unit configured to specify whether or not the geometric block partitioning merge is applied;
        a geometric block partitioning unit configured to specify a geometric block partitioning pattern and further perform geometric block partitioning on the target block divided in the rectangular shape by using the specified geometric block partitioning pattern; and
        a merge list construction unit configured to construct a merge list for the target block subjected to the geometric block partitioning and decode motion information, wherein
    the merge mode specifying unit is configured to add a determination condition for specifying whether or not the geometric block partitioning merge is applicable in a condition for determination of whether or not decoding of a regular merge flag that specifies whether or not the regular merge is applied is necessary, and the determination condition for applying the geometric block partitioning merge includes a determination condition based on an upper limit of a height of the target block and an upper limit of a width of the target block.

2. An image decoding method comprising:

applying geometric block partitioning merge to a target block divided in a rectangular shape, wherein the applying includes:

specifying whether or not the geometric block partitioning merge is applied;

specifying a geometric block partitioning pattern and further performing geometric block partitioning on the target block divided in the rectangular shape by using the specified geometric block partitioning pattern; and constructing a merge list for the target block subjected to the geometric block partitioning and decoding motion information, wherein in the specifying whether or not the geometric block partitioning merge is applied, a determination condition for specifying whether or not the geometric block partitioning merge is applicable is added in a condition for determination of whether or not decoding of a regular merge flag that specifies whether or not the regular merge is applied is necessary, and the determination condition for applying the geometric block partitioning merge includes a determination condition based on an upper limit of a height of the target block and an upper limit of a width of the target block.

3. A program stored on a non-transitory computer-readable medium for causing a computer to function as an image decoding device, wherein the image decoding device includes a merge unit configured to apply geometric block partitioning merge to a target block divided in a rectangular shape, the merge unit includes:

a merge mode specifying unit configured to specify whether or not the geometric block partitioning merge is applied;

a geometric block partitioning unit configured to specify a geometric block partitioning pattern and further perform geometric block partitioning on the target block divided in the rectangular shape by using the specified geometric block partitioning pattern; and a merge list construction unit configured to construct a merge list for the target block subjected to the geometric block partitioning and decode motion information, the merge mode specifying unit is configured to add a determination condition for specifying whether or not the geometric block partitioning merge is applicable in a condition for determination of whether or not decoding of a regular merge flag that specifies whether or not the regular merge is applied is necessary, and the determination condition for applying the geometric block partitioning merge includes a determination condition based on an upper limit of a height of the target block and an upper limit of a width of the target block.

* * * * *